United States Patent
Semeria et al.

(10) Patent No.: US 11,748,468 B2
(45) Date of Patent: *Sep. 5, 2023

(54) DYNAMIC SWITCHING BETWEEN POINTER AUTHENTICATION REGIMES

(71) Applicant: Apple Inc., Cupertino, CA (US)

(72) Inventors: Bernard J. Semeria, Palo Alto, CA (US); Devon S. Andrade, Santa Clara, CA (US); Jeremy C. Andrus, Sunnyvale, CA (US); Ahmed Bougacha, San Jose, CA (US); Peter Cooper, San Jose, CA (US); Jacques Fortier, San Francisco, CA (US); Louis G. Gerbarg, San Francisco, CA (US); James H. Grosbach, San Jose, CA (US); Robert J. McCall, New York, NY (US); Daniel A. Steffen, San Francisco, CA (US); Justin R. Unger, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,826

(22) Filed: Oct. 8, 2021

(65) Prior Publication Data

US 2022/0027452 A1 Jan. 27, 2022

Related U.S. Application Data

(63) Continuation of application No. 16/539,356, filed on Aug. 13, 2019, now Pat. No. 11,144,631.
(Continued)

(51) Int. Cl.
*G06F 21/44* (2013.01)
*G06F 15/78* (2006.01)
(Continued)

(52) U.S. Cl.
CPC .......... *G06F 21/44* (2013.01); *G06F 12/109* (2013.01); *G06F 15/7807* (2013.01);
(Continued)

(58) Field of Classification Search
CPC .............. G06F 12/109; G06F 9/45516; G06F 12/1491; G06F 21/565; G06F 15/7807;
(Continued)

(56) References Cited

U.S. PATENT DOCUMENTS

| 5,822,787 A | 10/1998 | Zucker |
| 90,328,218 | 12/2009 | Tsumkawa |

(Continued)

FOREIGN PATENT DOCUMENTS

| GB | 2547247 | 8/2017 |
| WO | 2016060817 | 4/2016 |

(Continued)

OTHER PUBLICATIONS

Digital Cellular Telecommunications System (Phase 2+) (GSM); Universal Mobile Telecommunications System (UMTS); LTE, 3GPP System Architecture Evolution (SAE); Security Architecture (3GPP TS 33.401 version 15.4.0 Release 15), 3GPP SA, No. V15.4.0, Jul. 2018, 162 pages.
(Continued)

*Primary Examiner* — Mohammad A Siddiqi
(74) *Attorney, Agent, or Firm* — Kilpatrick Townsend & Stockton LLP

(57) ABSTRACT

Embodiments described herein enable the interoperability between processes configured for pointer authentication and processes that are not configured for pointer authentication. Enabling the interoperability between such processes enables essential libraries, such as system libraries, to be compiled with pointer authentication, while enabling those
(Continued)

libraries to still be used by processes that have not yet been compiled or configured to use pointer authentication.

21 Claims, 21 Drawing Sheets

Related U.S. Application Data

(60) Provisional application No. 62/729,958, filed on Sep. 11, 2018.

(51) Int. Cl.

| | | |
|---|---|---|
| *G06F 21/78* | (2013.01) | |
| *G06F 21/54* | (2013.01) | |
| *G06F 12/109* | (2016.01) | |
| *G06F 21/56* | (2013.01) | |
| *G06F 21/12* | (2013.01) | |
| *H04L 9/32* | (2006.01) | |
| *H04L 9/08* | (2006.01) | |
| *H04L 9/40* | (2022.01) | |

(52) U.S. Cl.
CPC ............ *G06F 21/125* (2013.01); *G06F 21/54* (2013.01); *G06F 21/565* (2013.01); *G06F 21/78* (2013.01); *H04L 9/0861* (2013.01); *H04L 9/3236* (2013.01); *H04L 9/3247* (2013.01); *H04L 63/06* (2013.01)

(58) Field of Classification Search
CPC ...... G06F 9/4486; G06F 21/44; G06F 21/125; G06F 21/54; G06F 21/78; G06F 9/30076; G06F 12/1475; G06F 12/1425; G06F 9/30007; G06F 2212/657; G06F 2212/1052; G06F 2212/656; G06F 2221/2153; H04L 9/3236; H04L 9/3247; H04L 9/3231; H04L 9/0861; H04L 63/06

See application file for complete search history.

(56) References Cited

U.S. PATENT DOCUMENTS

| | | | |
|---|---|---|---|
| 7,835,343 B1 | 11/2010 | Reibel | |
| 9,274,573 B2* | 3/2016 | Giordano | G06F 21/71 |
| 9,378,372 B2* | 6/2016 | Kim | G06F 21/575 |
| 9,418,220 B1 | 8/2016 | McKee et al. | |
| 10,275,365 B1 | 4/2019 | Gonion | |
| 10,409,600 B1* | 9/2019 | Sierra | G06F 12/1408 |
| 10,891,369 B2* | 1/2021 | Semeria | G06F 9/30007 |
| 11,093,601 B2* | 8/2021 | Semeria | H04L 9/3247 |
| 11,144,631 B2* | 10/2021 | Semeria | G06F 21/565 |
| 2003/0182572 A1 | 9/2003 | Cowan et al. | |
| 2004/0098727 A1 | 5/2004 | Bjare et al. | |
| 2008/0126650 A1 | 5/2008 | Swanson et al. | |
| 2009/0204823 A1* | 8/2009 | Giordano | G06F 11/3648 |
| | | | 713/193 |
| 2013/0013965 A1 | 1/2013 | Guillemin et al. | |
| 2013/0077781 A1 | 3/2013 | Daemen et al. | |
| 2014/0173293 A1* | 6/2014 | Kaplan | G06F 21/54 |
| | | | 713/190 |
| 2015/0350913 A1 | 12/2015 | Eberwine et al. | |
| 2016/0013110 A1 | 1/2016 | Brokish et al. | |
| 2016/0110545 A1* | 4/2016 | Acar | G06F 21/52 |
| | | | 726/23 |
| 2017/0364452 A1 | 12/2017 | Okhravi et al. | |
| 2018/0329698 A1 | 11/2018 | Jawa et al. | |
| 2018/0365449 A1 | 12/2018 | Meriac et al. | |
| 2018/0367316 A1 | 12/2018 | Cheng et al. | |
| 2019/0034664 A1* | 1/2019 | Barnes | G06F 12/1441 |
| 2019/0238342 A1 | 8/2019 | Lian et al. | |
| 2019/0268169 A1 | 8/2019 | Castillo | |
| 2020/0104310 A1 | 4/2020 | Dageville et al. | |
| 2020/0356085 A1 | 11/2020 | Wentz et al. | |

FOREIGN PATENT DOCUMENTS

| | | |
|---|---|---|
| WO | 2017137714 | 8/2017 |
| WO | 2017180149 | 10/2017 |
| WO | 2018046073 | 3/2018 |

OTHER PUBLICATIONS

Dynamic Linker, Available Online at: https://en.wikipedia.org/w/index.php?title=Dynamiclinker&oldid=778702419, Accessed from Internet on: Aug. 27, 2018, 4 pages.
IOS Security iOS 11.4, Apple Inc., Aug. 2018, 80 pages.
Loader (Computing), Available Online at: https://en.wikipedia.org/w/index.php?title=Loader(computing)&oldid=841269915, Accessed from Internet on: Dec. 10, 2019, 4 pages.
Pointer Authentication on ARMv8.3 Design and Analysis of the New Software Security Instructions, Qualcomm Technologies, Inc., Qualcomm Product Security, Jan. 2017, 12 pages.
U.S. Appl. No. 16/539,356, Notice of Allowance dated Jun. 14, 2021, 10 pages.
U.S. Appl. No. 16/664,714, Notice of Allowance dated Oct. 14, 2020, 16 pages.
U.S. Appl. No. 16/664,719, Non-Final Office Action dated Sep. 2, 2020, 15 pages.
U.S. Appl. No. 16/664,719, Notice of Allowance dated Apr. 13, 2021, 8 pages.
Bletsch et al, Jump-Oriented Programming: A New Class of Code-Reuse Attack, ASIACCS '11, Available Online at: https://people.engr.ncsu.edu/tkbletsc/pubs/JOP.pdf, Mar. 22-24, 2011, 10 pages.
Lee et al., Dynamic Reencryption of Return Addresses, IET Information Security, vol. 13, No. 1, Jan. 1, 2019, pp. 76-85.
International Application No. PCT/US2019/048605, International Preliminary Report on Patentability dated Mar. 25, 2021, 26 pages.
International Application No. PCT/US2019/048605, International Search Report and Written Opinion dated Jan. 7, 2020, 32 pages.
International Application No. PCT/US2019/048605, Invitation to Pay Additional Fees and, Where Applicable, Protest Fee dated Oct. 15, 2019, 14 pages.
Shinagawa, SegmentShield: Exploiting Segmentation Hardware for Protecting against Buffer Overflow Attacks, Proceedings of the IEEE Symposium on Reliable Distributed Systems, Oct. 2-4, 2006, 10 pages.
Tuck et al., Hardware and Binary Modification Support for Code Pointer Protection from Buffer Overflow, Proceedings of the 37th International Symposium on Microarchitecture, Available Online at: https://cseweb.ucsd.edu/~calder/papers/MICRO-04-CodePointerProtection.pdf, Dec. 2004, 12 pages.

\* cited by examiner

DYNAMIC SWITCHING BETWEEN POINTER AUTHENTICATION REGIMES

CROSS-REFERENCE

This application is a continuation of U.S. application Ser. No. 16/539,356, filed Aug. 13, 2019, entitled "DYNAMIC SWITCHING BETWEEN POINTER AUTHENTICATION REGIMES," which claims priority of U.S. Provisional Patent Application No. 62/729,958, having the title "Dynamic Switching Between Pointer Authentication Regimes," to Bernard J. Semeria, et al., filed Sep. 11, 2018, the contents of which are herein incorporated by reference in their entirety.

FIELD

Embodiments described herein relate generally to computing systems having support for pointer and memory authentication and, more specifically to enabling dynamic switching between pointer authentication regimes.

BACKGROUND OF THE DESCRIPTION

ROP/JOP attacks are often used to attempt to compromise the security of a computer system, allowing an attacker to gain control of the system. A ROP (return oriented programming) attack is an advanced version of a stack smashing attack, where an attacker manipulates a program call state to overwrite the return address with an arbitrary address of the attacker's choosing. When an executed function returns, the function will pop the smashed return address from the stack and return to the address selected by the attacker. A JOP (jump oriented programming) attack manipulates the control flow of a program by attacking program code that includes an indirect jump instruction or a function pointer that can be manipulated using, for example, forced data type confusion. The attacker can force program code to jump to a "gadget" in memory, which are sections of existing instructions that are manipulated to perform a task helpful to an attacker. An attacker can chain gadgets together to execute malicious code on a victim processor.

SUMMARY OF THE DESCRIPTION

Embodiments described herein enable the interoperability between processes configured for pointer authentication and processes that are not configured for pointer authentication. Enabling the interoperability between such processes enables essential libraries, such as system libraries, to be compiled with pointer authentication, while enabling those libraries to still be used by processes that have not yet been compiled or configured to use pointer authentication.

One embodiment provides for a system comprising an integrated circuit including memory to store data and instructions and one or more processors coupled to the memory. Each of the one or more processors can be configured as an execution agent of the integrated circuit. The one or more processors can derive one or more agent master keys for use by one or more execution agents, the one or more agent master keys derived from a master key of the integrated circuit, derive a set of signature and authentication keys for use by the one or more execution agents, sign, by an execution agent, a memory address of a pointer with one or more of the signature and authentication keys associated with the execution agent, store the pointer to the memory, and authenticate the pointer before execution of an instruction associated with the pointer.

A further embodiment provides for a non-transitory machine readable medium storing instructions to cause at least one of multiple processors of a system on a chip integrated circuit (SOC) to perform operations comprising deriving one or more agent master keys for use by one or more of the multiple processors of the SOC, where the one or more agent master keys are derived from a master key of the SOC. The operations additionally include deriving a set of signature and authentication keys for use by one or more of the multiple processors, signing an address of a pointer using one or more of the signature and authentication keys, storing the pointer to a memory, and authenticating the pointer before executing an instruction associated with the pointer.

An additional embodiment provides for a method comprising, on a processor of an electronic device: generating a pointer, selecting a hardware-based key for use to generate a signature for the pointer, diversifying the hardware-based key with selected key diversification data to generate a diversified key, signing a value of an address within the pointer with the diversified key to generate a pointer signature, and verifying the pointer signature before referencing the address within the pointer with the processor.

The above summary does not include an exhaustive list of all embodiments in this disclosure. All systems and methods can be practiced from all suitable combinations of the various aspects and embodiments summarized above, and those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
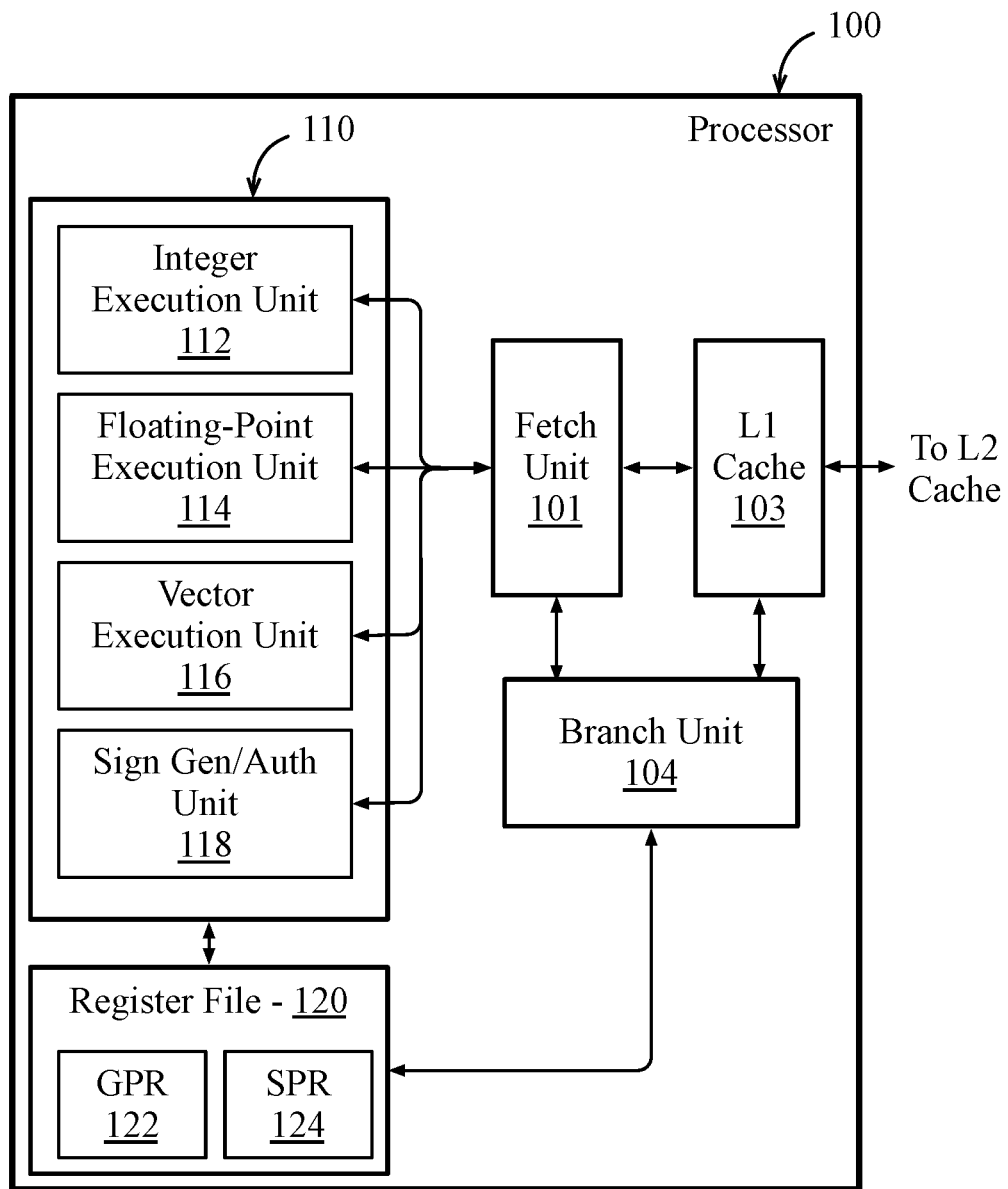
FIG. 1 illustrates a block diagram of hardware logic of a processor, according to embodiments described herein.

Computer processor designers have developed various techniques as a countermeasure against a variety of malicious exploits, including ROP/JOP attacks. For example, data execution prevention can be used to prevent the injection of arbitrary code by an attacker, as code injected into a data segment of a program will not be executed by the processor. Data execution protection forces attackers to use gadgets, which are existing instructions in the code segment of a program. Additionally, some processors include techniques that allow the signing and authentication of pointers and data structures, which can be used to detect modification to those pointers or data structures.

For example, a pointer, such as a function pointer or return address, can be given a cryptographic signature by the processor. When the pointer is used, the signature is authenticated by the processor to ensure that the details of the pointer have not been manipulated. Programs can be compiled or recompiled to make use of pointer and data protection features of a pointer authenticating processor, with the compiler automatically inserting the additional instructions to sign and authenticate pointers and data structures. Additionally, processors with pointer or data authentication features can be made backwards compatible, such that programs that have not been compiled with such protections can still execute.

However, some processors have a pointer and data authentication regime that does not natively allow the mixing of programs with and without pointer and data authentication. For example, if system libraries of an operating system are compiled with pointer and data authentication, those libraries are not automatically usable by programs that have not been compiled with pointer and data security enabled.

As described herein, where pointer authentication is referenced, the description can be applied generally to pointer and data authentication and protection techniques enables by computer processors, with any exceptions explicitly noted.

Embodiments described herein enable the interoperability between processes configured for pointer authentication and processes that are not configured for pointer authentication. Enabling the interoperability between such processes enables essential libraries, such as system libraries, to be compiled with pointer authentication, while enabling those libraries to still be used by processes that have not yet been compiled or configured to use pointer authentication. In one embodiment the interoperability is enabled by placing a copy of only the portions of system libraries that are used by processes without authentication in a separate region of virtual memory and mapping that separate region of virtual memory to those processes instead of the virtual memory that contains the authenticated version of the system libraries. Additionally, when a context switch occurs between processes with pointer authentication and processes without pointer authentication, the authentication features of the processor can be dynamically enabled or disabled.

Embodiments described herein also provide for an authentication key regime that enables the distinct authentication keys to be used when signing kernel mode and user mode pointers. A first set of keys are used to sign user mode pointers and different and/or additional keys can be used when signing addresses for kernel mode pointers. In such embodiments, a user mode pointer that is somehow caused to be signed by an attacker will not be valid for use in kernel mode. However, the kernel can sign pointers that can be validly used in user mode by temporarily disabling the use of the kernel key and/or enabling user mode keys when signing addresses for use by user mode.

Embodiments described herein also provide for thread state signing to ensure the thread state of a sleeping or waiting thread is not manipulated while the thread waits to resume execution. When a thread is in a sleeping or waiting state, or when an interrupt or exception occurs during execution of a thread, a thread state for the thread can be stored in memory. The thread state can include details such as the execution state (e.g., register values) of the tread and the program counter or instruction pointer associated with the thread. When a thread is sent to sleeping or waiting state, sensitive portions of the thread state can be signed by the processor before the thread state is stored to memory. When the thread is resumed, those pointers of the thread state can be authenticated to ensure that the thread state has not been manipulated while the thread was in the waiting or sleeping state. Once the thread state is authenticated, the thread state can be restored to the processor and thread execution can be resumed.

Embodiments described herein also provide for pointer application binary interface (ABI) versioning. An ABI versioning scheme enables the specific details of the signed or unsigned elements of system libraries to change between major or minor version revisions of an operating system. Program code used to sign pointers or data structures within system libraries can be annotated with a version number scheme that is associated with a specific set of signed or unsigned data structures and pointers. Third-party applications can be compiled for use against a specific pointer authentication ABI version, where during compilation the third-party applications are compiled with the knowledge of which system library pointers and data structures are expected to be signed. If a third-party application is executed on a system with a mis-matched pointer authentication ABI, address signing can be disabled for that application, allowing the application to execute without crashing, although the application may execute in a slightly less secure state. Execution of system binaries with a pointer authentication ABI mismatch can be disallowed, as the pointer authentication ABI version of system binaries and libraries should always match. A mismatch in pointer authentication ABI between a system binary and a system library may suggest that the system is has been compromised.

In one embodiment, dynamic pointer authentication ABI versioning can be enabled for third party applications that are submitted in a bitcode format. Such applications can be dynamically compiled for the target OS and pointer version on which the application will be executed.

FIG. 1 is a block diagram illustrating details of processor 100, according to embodiments described herein. The processor 100 includes an L1 cache 103, an instruction fetch unit 101, a branch unit 104, an execution core 110, and a register file 120. The L1 cache 103 can cache instructions and/or data that is used by the execution core 110. The fetch unit 101 can fetch instructions from the L1 cache 103 (or an L2 cache) and provide those instructions to the execution core 110 for processing. The branch unit 104 can be configured to generate branch target program counter addresses (PCs) for the fetch unit 101 for branch instructions. The branch unit 104 can include a branch prediction unit to predict whether a branch will be taken or not taken. The execution core 110 includes, in one embodiment, an integer execution unit 112, a floating-point execution unit 114, a vector execution unit 116, and a signature generator/authentication unit 118. The integer execution unit 112, floating-point execution unit 114, and vector execution unit 116 as a group may be interchangeably referred to as "the execution units." The execution units can perform computational operations such as logical operations, mathematical operations, or bitwise operations, for example, for an associated type of operand. The signature generator/authentication unit 118 can be used to generate signatures for pointers and data structures used for program code executed on the processor 100. Many execution units can reside in each execution core of a processor 100 and the processor 100 can include multiple instances of the execution core 110. Additionally, the multiple instances of the execution core 110 can be of different architectures. The register file 120 can contain a set of general-purpose registers 122 (GPR) or special purpose registers 124 (SPR) that are used to store data or state information for instructions executed by the execution core 110. The general-purpose registers 122 can be configured to store data of various types (e.g. integer, floating point, multimedia, vector, etc.). The special purpose registers 124 can store operands or data that is used for particular instructions or subsets of instructions. For example, in some embodiments, a program counter register may be a special purpose register storing the fetch address of an instruction. A link register may be a register that stores a return address for use by branch instructions.

Although the processor 100 is illustrated having a particular set of components, in various embodiments the processor 100 can include different numbers or types of execution units, functional units, and pipeline stages such as an instruction decode unit, a scheduler or reservation stations, a reorder buffer, a memory management unit, I/O interfaces, and other components that can be coupled to the execution units. Additionally, in various embodiments the illustrated components may be found in different combinations or arrangements than shown, with some components combined with other components into a single module.

The processor 100 can be configured to perform sign and authenticate operations on return addresses and/or jump addresses and to detect whether the addresses have been modified between the time the addresses were created/stored and the time the addresses are to be used as a target. The addresses may be signed when written to memory, in some embodiments. For example, return addresses for subroutine calls may be written to the stack in memory. Jump addresses can be written to an arbitrary memory location for later retrieval. When the addresses are later retrieved to be used as a jump/return target address, the processor 100 can be configured to perform an authenticate operation on the addresses. Instead of branching or jumping to an address an error handling operation can be initiated if the authenticate operations fails. In one embodiment, the sign and authenticate operations can be performed on addresses in registers as well. For example, a general-purpose register 122 in the register file 120 can be used as a source for a return address or jump address and can be signed and authenticated. Additionally, A special purpose register 124 such as a link register can be signed and authenticated, in some embodiments. Performing a sign operation on a value may be more succinctly referred to herein as "signing" the value. Similarly, performing an authenticate operation on a value may be more succinctly referred to herein as "authenticating." In one embodiment, data pointers (addresses to data in memory, where the data is operated upon during instruction execution in the processor 100) can also been signed and authenticated. In one embodiment, data structures, as a whole or specific portions thereof, can be signed and authenticated.

Generally, performing a sign operation or "signing" an address refers to applying a cryptographic function to the address using at least one cryptographic key and optionally using additional data. The result of the cryptographic function is a signature. By applying the cryptographic function again at a later point and comparing the resulting value to the signature, an authenticate operation may be performed on the address (or the address may be "authenticated"). That is, if the address and/or signature have not been modified, the result of the cryptographic function should equal the signature. The cryptographic key may be specific to the thread, process, or context that generates and uses the address, thus the likelihood of an undetected modification by a third party may be exceedingly remote. In some instances, a global key is used that is not specific to a thread, process, or context. For example, addresses or data that may be legitimately used or modified by other contexts can be signed using a global or context-independent key. The cryptographic key may be generated, at least in part, based on a "secret" that is specific to the instance of the processor 100 and is not accessible to software. The cryptographic key itself may also not be accessible to software, and thus the key may remain secret and difficult to discover by a third party.

In an embodiment, the optional additional data used in the signing and authentication of a return or jump address may include an address at which the return or jump address is stored. For example, a virtual address of the location may be used such as a virtual stack pointer, for storage of the address on the stack, or a virtual address to a memory location. Other embodiments may use the physical address. The cryptographic function applied to the return/jump address may be an encryption of the address using the key(s). The encrypted result as a whole may be the signature, or a portion of the result may be the signature (e.g. the signature may be shortened via truncation or shifting). Any encryption algorithm may be used, and some details with respect to key length, key whitening, and key diversification data may vary based on the underlying cryptographic implementation.

As described herein, a hardware instruction refers to an executable entity defined in an instruction set architecture implemented by the processor 100. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including the instruction's coding in memory, the instruction's operation, and the instruction's effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 100. Some instructions may be microcode instructions in some architectures. Accordingly, the term "instruction operation" may be used herein to refer to an operation that an execution unit in the processor 100 and/or execution core 110 is configured to execute as a single entity. Instructions may have a one to one correspondence with instruction operations or can have a many to one correspondence with instruction operations.

In some instances, software instructions are described, which refer to commands or other elements of program code that can be compiled or interpreted into hardware instructions that are executed by the processor 100. Software instructions can be high level program code, an intermediate representation of program code, or low level program code, where the low level program code may directly correspond with the underlying hardware instructions that are executed by the processor 100.

Figure 2:
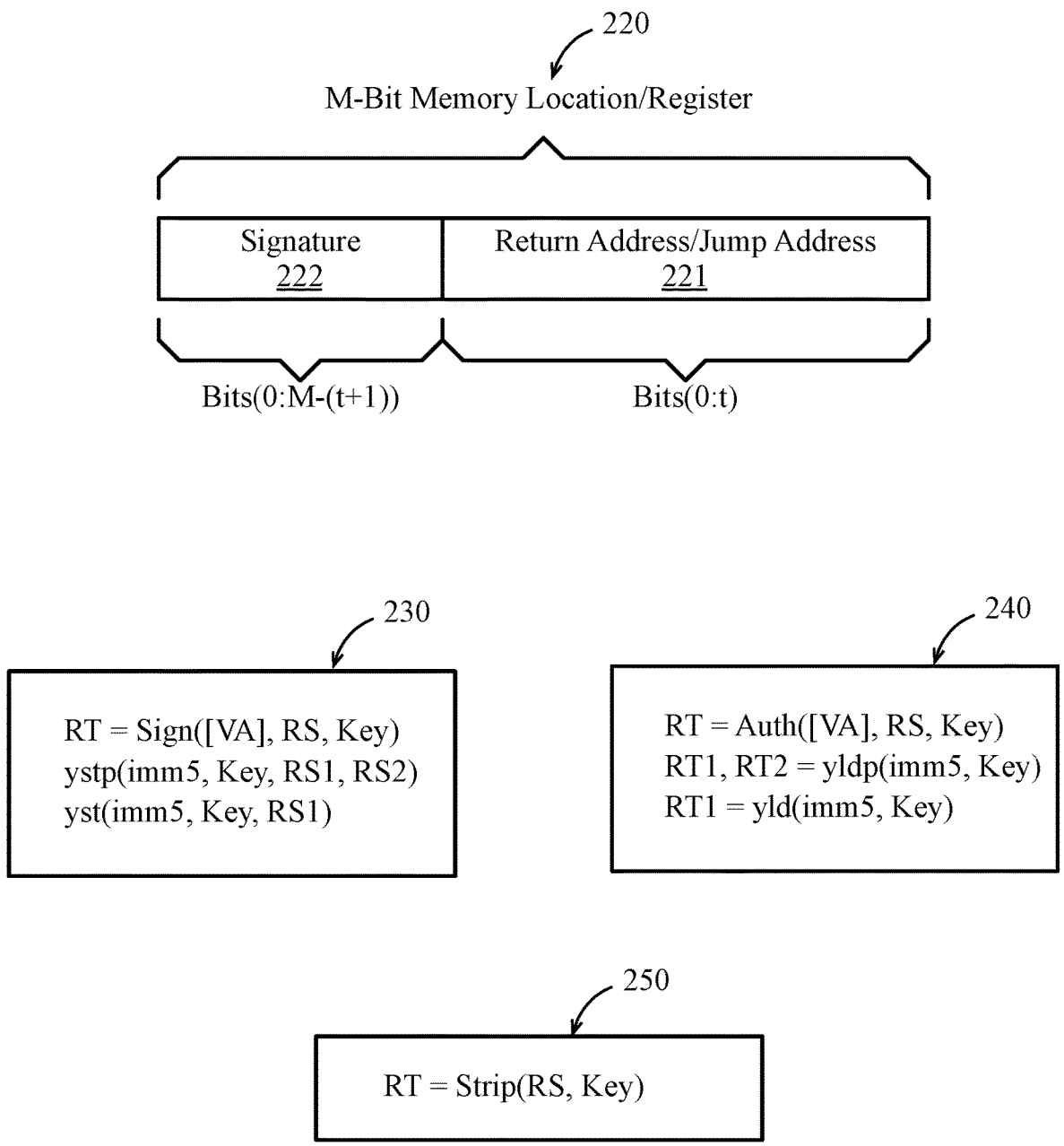
FIG. 2 illustrates techniques to sign and authenticate memory locations and registers, according to an embodiment.

FIG. 2 illustrates techniques to sign and authenticate memory locations and registers, according to an embodiment. A block diagram illustrating an M-bit memory location or register (220) is shown, where the value M may be an integer value greater than zero. In one embodiment, M represents the architectural size of a memory address space of the processor 100 of FIG. 1. For example, some instruction set architectures specify 64-bit addresses. However, the actual implemented size of the address space may be less than 64 bits, such as, for example, between 40 bits and 48 bits. In such implementations, some of the address bits are effectively unused. The unused bits can instead be used to store a signature (field 222) for the address, although in some implementation the signature can be stored in a different memory location.

In the embodiment, t+1 bits of return address or jump address are implemented (field 221), where t is less than M and is also an integer. The remaining bits of the register/memory location store the signature (field 222). The signature as generated from the encryption algorithm may be larger than M−(t+1) bits, which is larger than the signature (field 222). Accordingly, in some implementations only a portion of the signature is stored. For example, the signature can be truncated or right shifted before being stored. Any mechanism for shortening the signature field may be used.

The processor 100 can implement the signature generation and authentication in hardware, for example, via the signature generation/authentication circuit 118 of in FIG. 1. The signature generation/authentication circuit can include circuitry to sign and authenticate return addresses and jump addresses. Additionally, there may be instructions defined for the instruction set architecture which cause the signature to be generated or authentication to be performed.

In one embodiment, a special pointer format can be used for return address protection only, in which a larger (M+K bit) pointer type is used for the link register than is used for other userland pointers. This larger pointer can carry a K-bit return address signature while also carrying an unmodified return address. The larger pointer can be used in recompiled bitcode without requiring changes to normal programs. Additionally, for any 32-bit value that is to be signed and stored into a 64-bit register, the signature can be added within the upper 32-bits without overwriting part of the 32-bit value.

Code block 230 illustrates several code sequences that make use of signature generation using signature generation instructions. For example, a Sign instruction takes as input operands an optional virtual address (VA), a source register (RS), and a key. The virtual address may be in a register as well. The key may be stored in a hardware-accessible register or other storage device for access by the hardware only. The key may be one key, or multiple keys, depending on the encryption algorithm that is implemented by the processor 100.

The Sign instruction may apply an encryption algorithm to the data (e.g. RS, VA) to produce a signature that can be written to target register RT. When more than one datum is provided, the data may be combined prior to the encryption. For example, source register RS and virtual address VA can be logically combined according to any desired logic function. The resulting data from the combination can then be encrypted. Alternatively, the data can be concatenated and encrypted using multiple passes of a block encryption, such as a block cipher mechanism. Any type of encryption may be used, including the advanced encryption standard (AES), data encryption standard (DES), international data encryption algorithm (IDEA), or the PRINCE algorithm. A factor in determining the encryption algorithm to be used is latency of the algorithm. Accordingly, a single pass of encryption may be selected that is strong enough to protect the encrypted data to a desired level of security. A signature resulting from the encryption may then be shortened to match the signature field (field 222) as in FIG. 2.

The virtual address may be an optional part of the signature generation. Inclusion of the virtual address provides information related to the location at which the return address/jump address is stored. Accordingly, if the signed return address/jump address is moved and later retrieved from a different location, authentication with the virtual address of the new location may fail. In some cases, it may be desirable for the signed address to be moved (e.g. when used in shared libraries). In such cases, the virtual address may not be included in the signature generation nor in the corresponding authentication. In such cases, a constant value may be used in place of the virtual address.

In one embodiment the signature generation instruction can operation on data being stored to memory. For example, the ystp instruction of code block 230 can store a pair of registers RS1 and RS2 to a location in the stack identified by the immediate field imm5. That is, the imm5 field may be an offset from the stack pointer. The ystp instruction can also sign at least one of the register values, or both in another embodiment, using the key and the selected encryption algorithm (and optionally the virtual address to which the pair is being stored, e.g. the stack pointer plus the imm5 field). The pair of registers may be, for example, general purpose registers that are often used by a compiler for the processor 100 as the frame pointer and the link register. The link register may be signed in response to the instruction, and the signed value may be stored to memory. While the ystp instruction stores a pair of registers to memory, a corresponding yst instruction may be defined that stores one register to memory and generates a signature for the register data. Other instructions may store other numbers of registers to memory and can generate signatures for any subset of the registers. Furthermore, other instructions may use other addressing modes and need not store the signed addresses on the stack.

Code block 240 illustrates several code sequences that make use of authentication instructions. For example, an Auth instruction takes as input operands an optional virtual address (VA), a source register (RS), and a key or keys. The virtual address may be in a register as well. The key(s) may be stored in a hardware-accessible register(s) or other storage device(s) for access by the hardware only.

The Auth instruction may apply the same encryption algorithm as the Sign instruction to the virtual address and the return/jump address (field 221) of the source register data (e.g. RS, VA) producing a signature which may be written to a target register RT. The resulting signature may be compared to the signature (field 222) of the source register data. The resulting signature can be shortened in the same fashion as the original signature was shortened. If the signatures do not match, the authentication fails and return/jump to the address is prevented. If the signatures match, the authentication passes and return/jump to the address is permitted. The return/jump may be prevented, for example, by causing an exception or trapping program execution. In the case of a data pointer, if the authentication fails, an exception may be signaled instead of permitting the data pointer to be used.

In one embodiment the authentication instruction may operate on data being read from memory. For example, the yldp instruction shown in FIG. 4 can load a pair of registers RT1 and RT2 from a location in the stack identified by the immediate field imm5. That is, the imm5 field may be an offset from the stack pointer. The yldp instruction may also authenticate at least one of the register values, or both in another embodiment, using the key(s) and the selected encryption algorithm (and optionally the virtual address from which the pair is being read, e.g. the stack pointer plus the imm5 field). The pair of registers may be, e.g., general purpose registers that are often used by a compiler for the processor 100 as the frame pointer and the link register. The link register may be authenticated in response to the instruction, and an exception may be signaled if the authentication fails. While the yldp instruction reads a pair of registers from memory, a corresponding yld instruction may be defined that reads one register from memory (and authenticates the data). Other instructions may load other numbers of registers from memory and may authenticate any subset or all of the registers and may use other addressing modes and may store addresses elsewhere than on the stack.

In one embodiment, it may be desirable to remove the signature from the address without authenticating the address. A strip instruction may be defined that may remove the signature and replace it with the original bits from the address, such as, for example, a sign extension of the address (field 221), or zeros. Code block 250 includes an example strip instruction, which can take a source register RS and a key, which is the key used to sign the address in the source register and output the address to the target register (RT) with the signature removed. The strip instruction can be used to write authenticated pointers to memory that will be used by legacy software that does not have support for pointer and/or data authentication or when generating output for debugging purposes. For example, debuggers can be configured to detect and strip signatures from pointers in various features, like printing values, forming back traces, and setting up breakpoints. A stack unwinder can be configured to recognize signed return addresses and strip the signatures while crawling the stack. Other dynamic tools, such as stack trace collectors, can be configured to strip signatures when symbolicating function addresses. Tools that deal with core dumps or other relics of a crashed program can also be configured to use the strip instruction to strip addresses. Each of these tools can be configured to be pointer authentication ABI aware, such that the tools know which keys and additional data to use to correctly strip addresses.

Figure 3A:
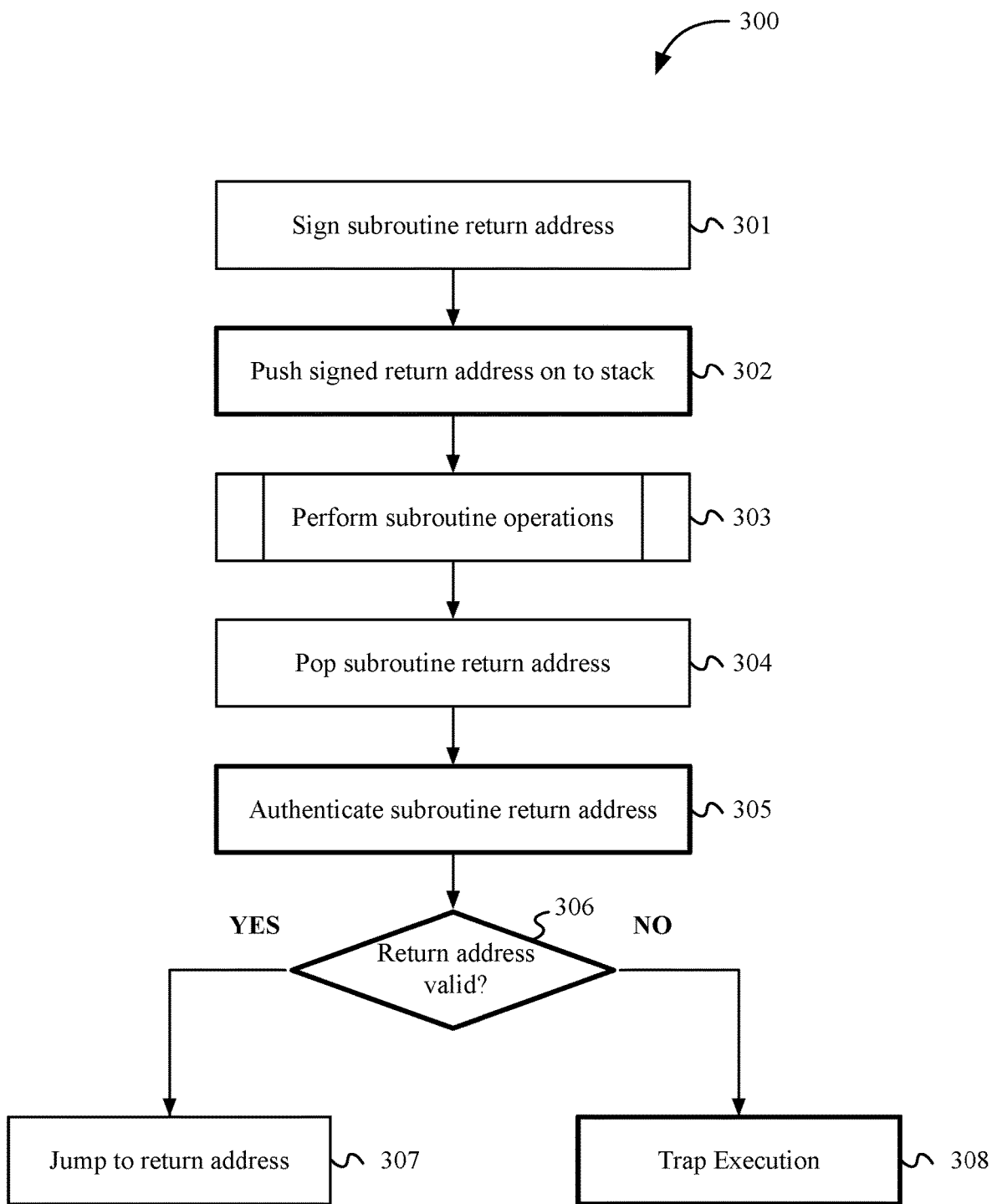
FIG. 3A-3C illustrate methods to sign return and authenticate pointer values and to transition between authenticating and non-authenticating processes.
Figure 3B:
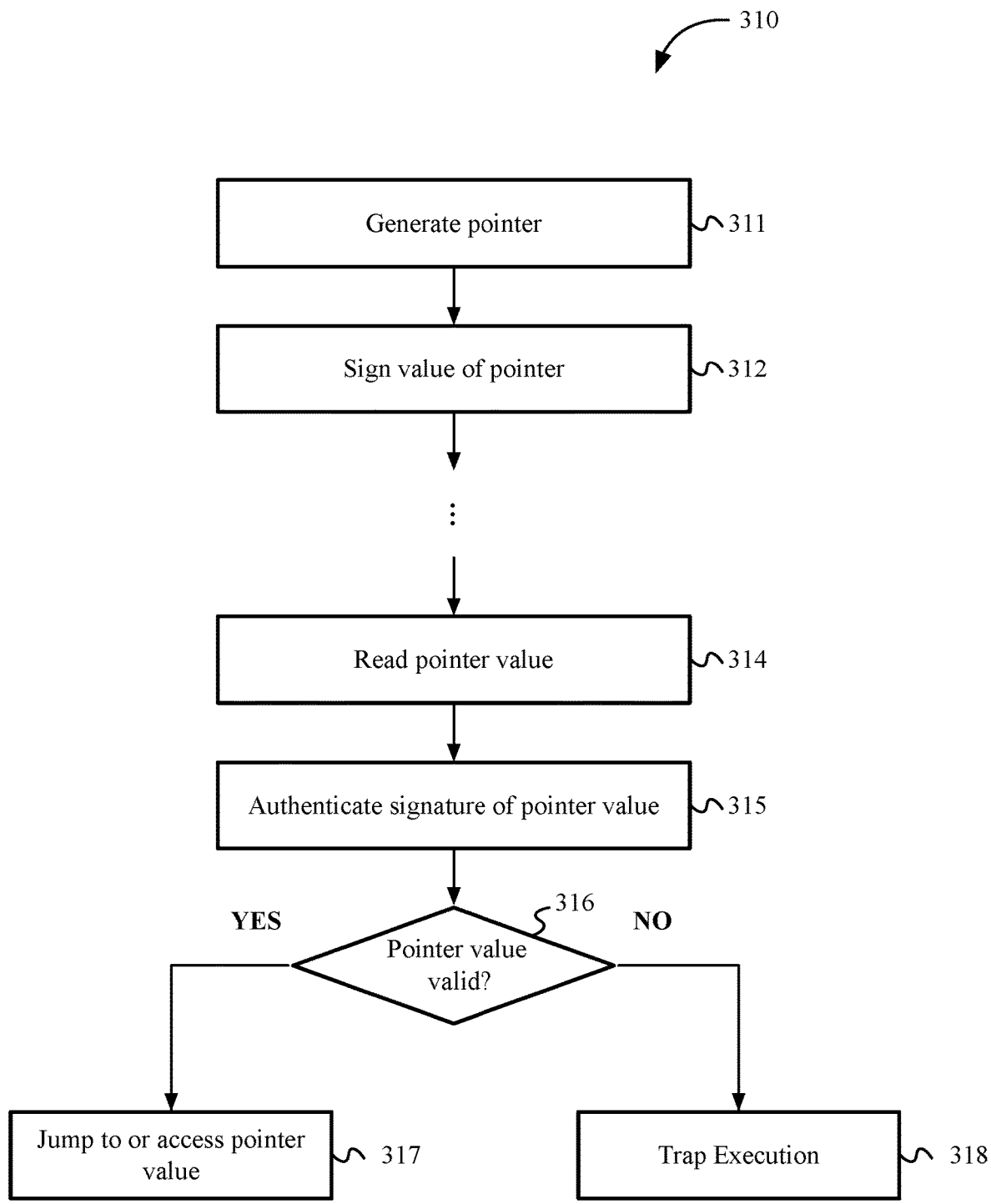
Figure 3C:
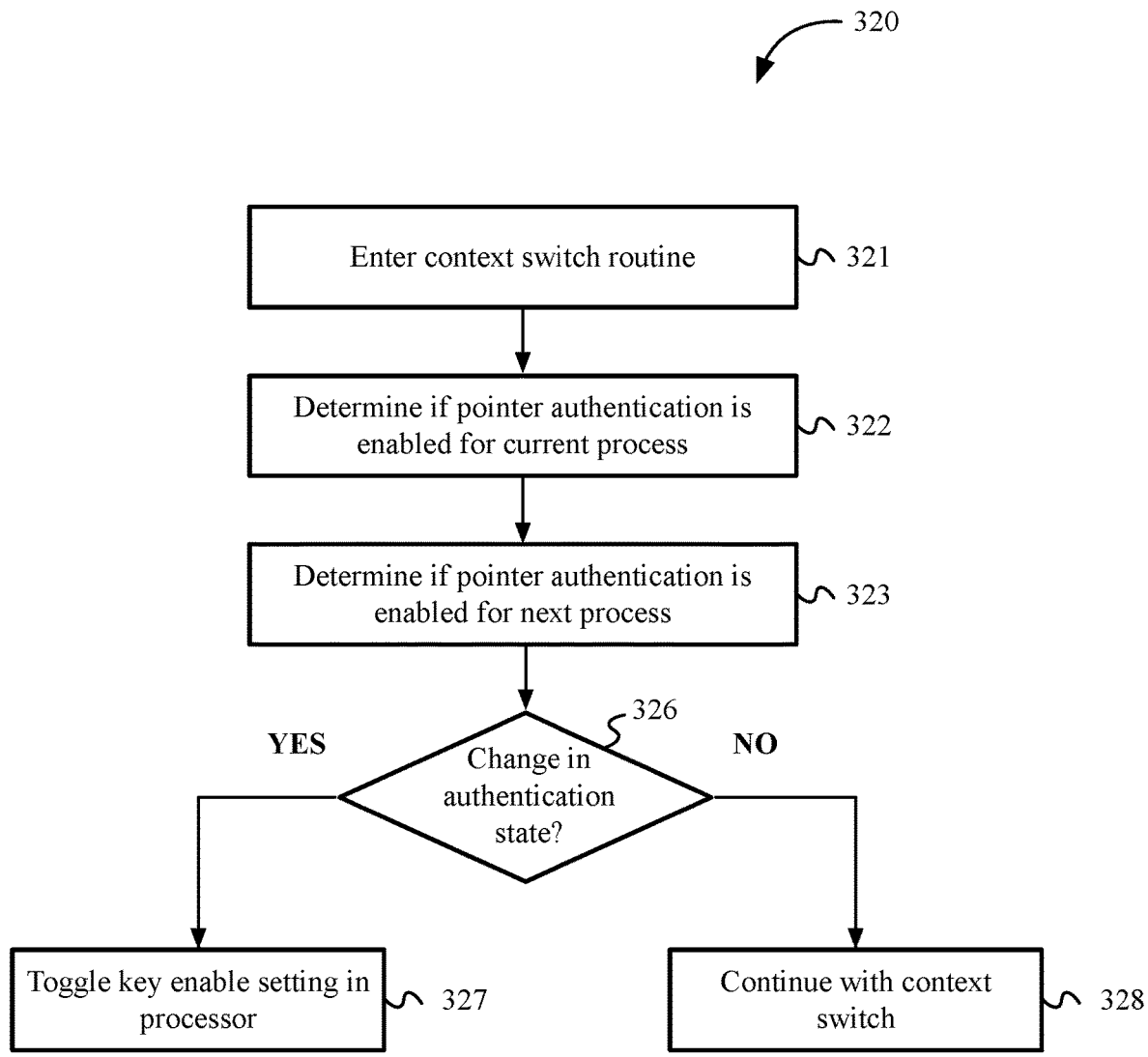

FIG. 3A-3C illustrate methods to sign return and authenticate pointer values and to transition between authenticating and non-authenticating processes. While the operations illustrated and described below are shown in a particular order for ease of understanding, other orders may be used. The operations shown in the flow charts below can be implemented by the processor 100 of FIG. 1, or components therein.

Method 300 is shown in FIG. 3A and includes for the processor 100 to sign a subroutine return address (block 301) using a variant of the instructions shown in FIG. 2. The virtual address (VA) to be used in signing the return address may be the stack pointer (SP), or alternatively, the stack pointer added to an offset which identifies the location at which the return address is to be pushed. The signature can be based on the VA, the return address (RA), and a key. The signature can be generated by applying the selected encryption algorithm to the input data (VA, RA, key). In one embodiment, the signature can be generated based on multiple keys. For example, the encryption algorithm can uses a key pair (K0 and K1), where K0 may be a "whitening" key, while K1 may be a "core" key. The core key may be used in the iterations of the block cipher and the whitening key may be used before and/or after the iterations are complete to further modify the data. The generated signature may be combined with the return address to form the signed return address (e.g. field 222 as in FIG. 2).

The processor 100 can then push the signed return address for the subroutine onto the stack (block 302). The push may occur in the calling code, before jumping to the address of the subroutine, or may occur within the subroutine. In one embodiment, signing the subroutine return address (block 301) and pushing the subroutine return address (block 302) each occur within the subroutine, allowing the callee to determine the signing details of the return address. Where signing is made an internal implementation detail of each function, the return address will be unsigned since at function boundaries.

The subroutine may include instructions that perform the operation(s) for which the subroutine is designed. The instructions to perform the subroutine can be performed (block 303) and when the subroutine is complete, the subroutine can pop the subroutine return address from the stack (304) and authenticate the subroutine return address (block 305). The signed return address may be loaded from the stack memory location into a target register. Similar to the original signature generation, the VA may be set to the stack pointer or the stack pointer plus an offset to the location of the return address. The signed return address can be authenticated by applying the same operation that was applied when the return address was initially signed and comparing the generated value to the signature. If the signature remains valid (e.g., the signature generated in the authentication matches the original signature in the address) (block 306, "yes"), the return address may be used. That is, the processor 100 can jump to the return address (block 307). Otherwise (block 306, "no"), the processor 100 can trap execution (block 308) or otherwise signal an exception to prevent the return address from being used.

Method 310 shown in FIG. 3B illustrates that signing and authentication can be performed on arbitrary memory addresses and is not limited to subroutine return addresses. A pointer to memory can be generated and written to memory or a register (block 311). The address of the pointer can be signed (block 312) in a manner similar to signing a return address at block 301 of FIG. 3A. Subsequently, the pointer may be read (block 314) and authenticated (block 315). Authenticating the pointer at block 315 may be performed similarly to authenticating a return address at block 305, except that the signed address need not be in the stack and may be stored in a register. Similarly, if the pointer value is valid (block 316, "yes"), the processor 100 can jump to the pointer value or access data at the pointer value (block 317). Otherwise, (block 316, "no") the processor 100 can trap execution (block 318) or otherwise signal an exception to prevent the return address from being used. In one embodiment, a failed authentication additionally results in an address value that is guaranteed by the processor to be an illegal address and the use of this illegal address can result in the trap or exception of block 318 and/or block 308 as in FIG. 3A.

As described above, it may be necessary to switch between enabling pointer or return address authentication and disabling pointer or return address authentication, for example, when switching between applications that do or do not support address signing. In one embodiment, the enabling or disabling signing and/or authentication can be performed at the context switch boundary between processes. Enabling or Disabling signing and/or authentication can be performed by enabling or disabling the one or more keys that are used to generate and authenticate signatures. When a key used for a sign or authenticate instruction is disabled, the instruction effectively becomes a NO-OP. In one embodiment, the sign or authenticate instruction may still be executed by the processor, but processor will output the input value unchanged.

Method 320 shown in FIG. 3C illustrates operations performed by an operating system kernel executing on the processor 100. The kernel can enter a context switch subroutine (block 321) upon a context switch between processes executing on the processor 100. The context switch routine can determine if pointer authentication is enabled for the current process (block 322). The context switch routine can then determine if pointer authentication is enabled for the next process (block 323). If there is a change in authenticate state (block 326, "yes"), the kernel can toggle a key enable setting in the processor 100 (block 327). Toggling the key enable setting will either enable pointer signing when switching to a process that is configured to use pointer signing or disabling pointer signing when switching to a process that is not configured to use pointer signing. In one embodiment, toggling the key enable setting can enable or disable specific keys without enabling or disabling other keys. If no switch is needed (block 326, "no") then the kernel can simply continue with the context switch (block 328). In one embodiment, when switching from two processes in which pointer authentication is enabled, per-process keys can be changed to the keys associated with the target context of the context switch.

Figure 4A:
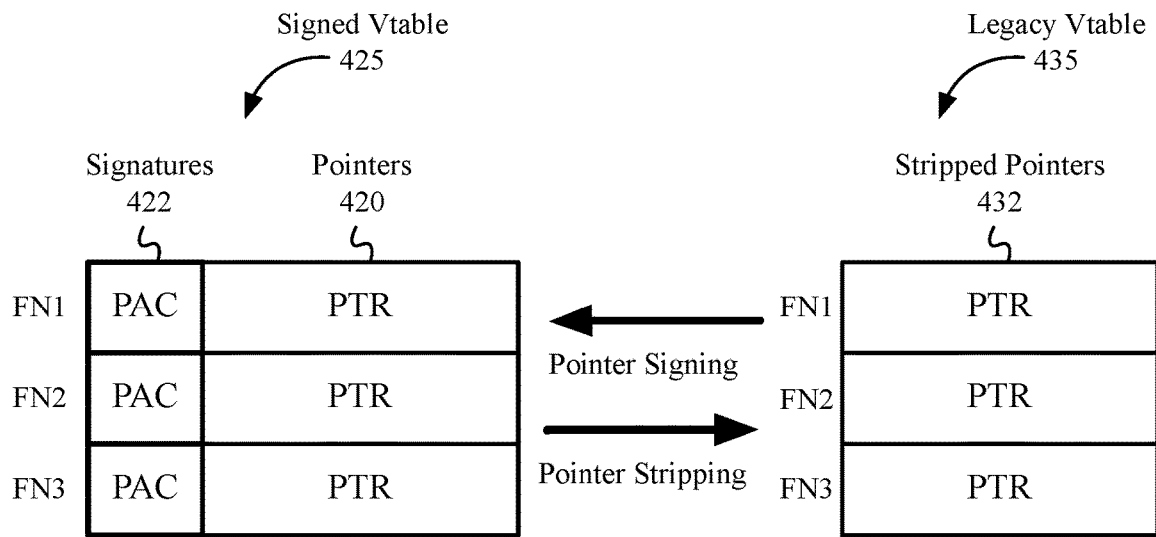
FIG. 4A-4C illustrates differences between software architectural elements when address signing is enabled and disabled, according to embodiments.
Figure 4B:
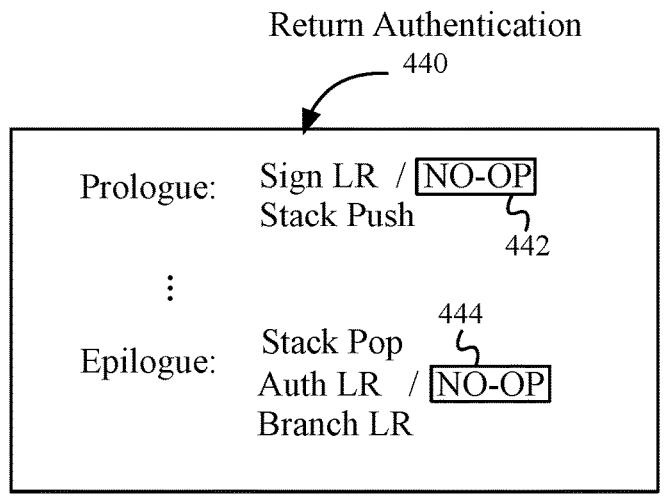
Figure 4C:
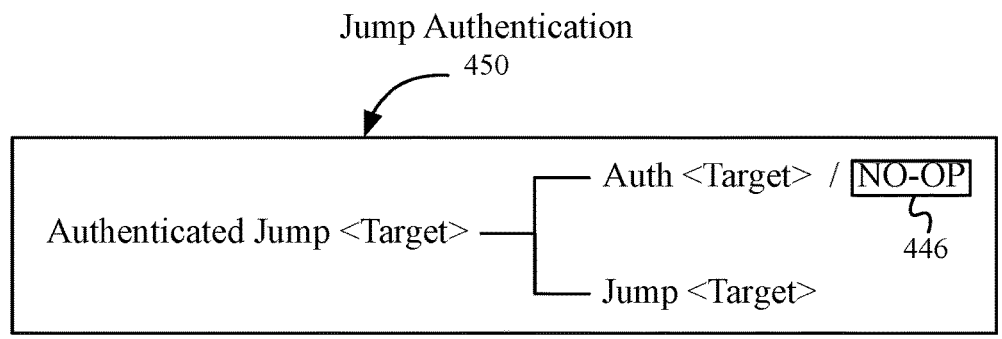

FIG. 4A-4C illustrates differences between software architectural elements when address signing is enabled and disabled, according to embodiments. FIG. 4A compares virtual function tables with and without pointer signing. FIG. 4B illustrates subroutine calls with and without pointer protection. FIG. 4C illustrates jump authentication with and without pointer projection.

As shown in FIG. 4A a signed virtual function table (signed vtable 425), or a similar data structure that contains function pointers, can store a set of signed pointers that include a set of signatures 422 and a set of pointers 420. In one embodiment, for each function pointer (FN1-FN3), a signature in the form of a pointer authentication code (PAC) can be appended to the pointer value, although other types of signatures can be used. In one embodiment, to enable a signed vtable 425 to be usable by legacy code, a legacy vtable 435 can be created using a strip instruction, such as the Strip instruction illustrated in FIG. 2, to authenticate and remove the signatures 422 from the pointers 420 of the signed vtable 425. Legacy processes can then access the legacy vtable 435 without triggering a runtime error upon accessing the function pointers.

In one embodiment, the legacy vtable 435 is created initially and the signed vtable 425 can be created using pointer signing functions, such as the Sign instruction shown in FIG. 2. In such embodiment, the program loader can load the pointers 420 into memory and apply the signatures 422 based on load information provided with the program binary. The load information can include additional information that specifies how to generate the signatures 422, including the key to use to generate the signature and diversification data to use when generating the signature. The additional information does not significantly increase the size of the program binary. When loading a legacy binary, the signing operation can be bypassed.

In one embodiment, the signatures 422 applied to the signed vtable 425 can be applied by the linker at link-time, enabling the signed vtable 425 to be written to the binary in a signed state. The signatures 422 can be applied at link-time for scenarios in which the system is able to commit to the use of a constant signing key for a binary, while applying the signatures at load time enables the load to use a key that is not known by the linker at link time. The signatures 422 generated for the pointers 420 that are applied to a binary file can be diversified based on the address of the pointers, associating the pointer with a specific location in memory. If the function pointers are to be copied in memory, the copy can be performed using a specific API command or instruction that strips, copies, and re-signs the copied pointer with the destination address to which the pointer is copied. In-binary pointer signing can be optimally applied when the base address at which the binary is to be loaded is known at link time. If the base address is not known at link-time, then pointers that were signed using the pointer address as diversification data will be resigned dynamically by the program loader.

As shown in FIG. 4B, instructions to sign and authenticate pointers are processed as NO-OP instructions when the keys used by the instructions are disabled. FIG. 4B illustrates return authentication 440 in which return address signing and authentication is performed for program code that is compiled to use pointer authentication. In one embodiment, signing and authentication of return addresses is performed by the callee and return addresses are unsigned at subroutine boundaries. The subroutine prologue and epilogue can include instructions that are automatically added at compile time to a subroutine. In some implementations, the subroutine return address is stored in a link register, although the link register may be absent in other implementations. The return address within the link register can be signed using the return address signing methods described herein (e.g., method 300 of FIG. 3A) and the return address can be pushed on to the stack. However, when the key used to sign the link register is disabled, for example, when legacy processes are executing, the instruction to sign the link register will be processed as a NO-OP 442 and no operation will be performed. Instead, the legacy process will push the link register into the stack without applying a signature.

When execution of the subroutine completes, the subroutine epilogue is executed, where the return address is popped off the stack and stored in the link register. For processes that are compiled with signing and authentication enabled, an authorization instruction is executed. For legacy processes that are executing with the relevant keys disabled, a NO-OP 444 is performed instead of the authorization operation for the link register. Legacy and signing-enabled processes can each then execute the return by branching to the address in the link register.

As shown in FIG. 4C, jump authentication 450 can be performed as a NO-OP 446 for legacy processes that execute with keys disabled, before jumping to a specified jump target. The keys used for return protection (ROP) can be different from the keys used for jump protection (JOP), allowing JOP protections to be disabled in legacy code while retaining ROP protections.

In one embodiment, fused instructions are provided to enable the efficient performance of operations to sign and push, authenticate and jump, or otherwise combine an operation with the generation or authentication of a signature. For example, a variant of the yst instruction shown in code block 230 of FIG. 2 can be used to sign a register value, such as the link register, and store the signed value to the stack. For such fused instructions, if the key that would be used to perform the sign authenticate operation is disabled, the processor can bypass the sign or authenticate portion of the instruction.

Figure 5:
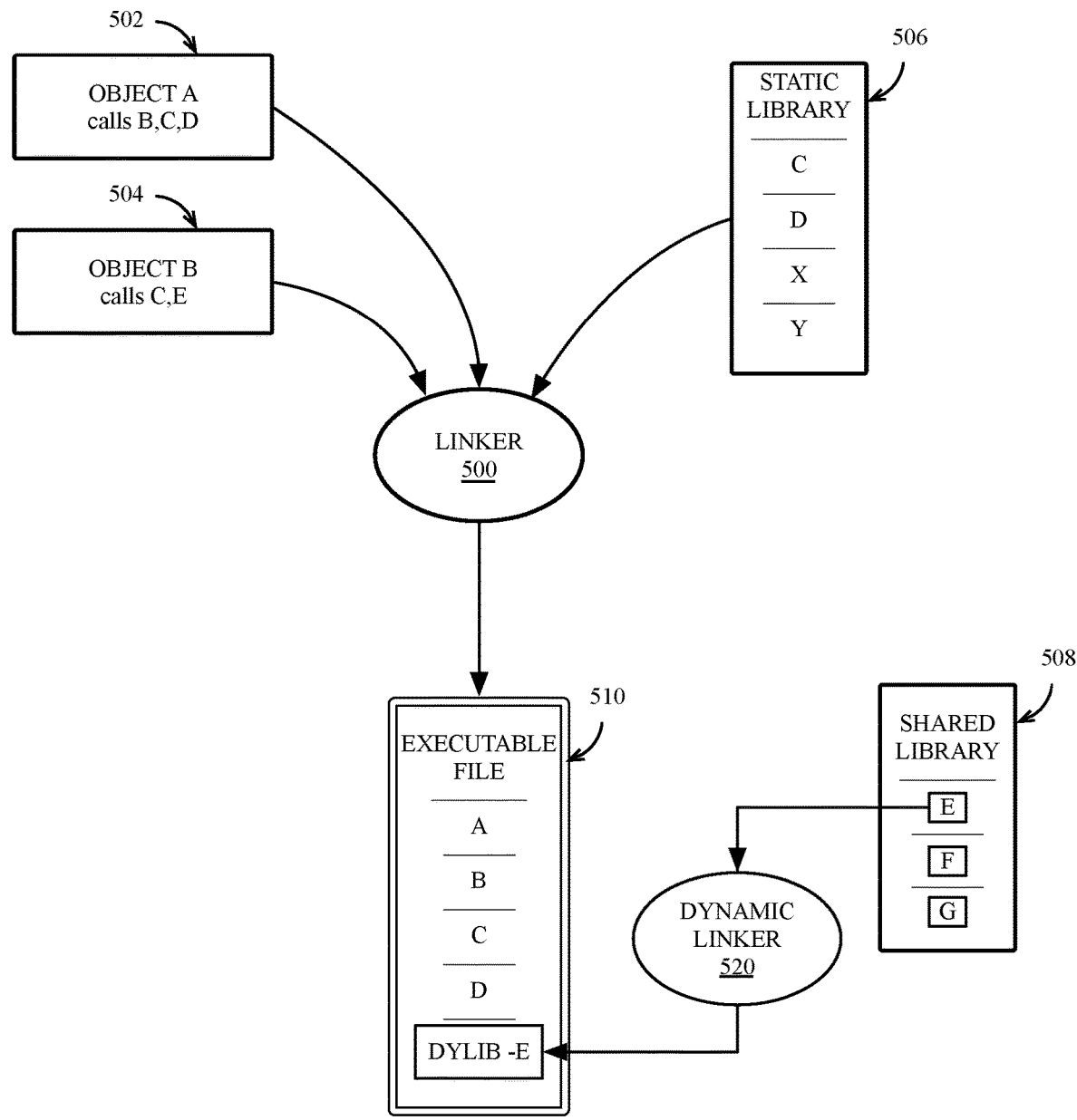
FIG. 5 is a block diagram illustrating a linking and loading process, according to an embodiment.

FIG. 5 is a block diagram illustrating a linking and loading process, according to an embodiment. In one embodiment, system-level shared libraries for a computing system will be compiled with support for address signing and authentication. Without the ability to switch between signed and unsigned contexts, a process without support for signing and authentication will not be able to execute subroutines loaded from the system-level shared libraries. An overview of static and dynamic linking is provided to give context to further description to follow.

In one embodiment, the linker 500 generates an executable file 510 to run on the processor 100 by combining binary object files (e.g., object A 502, object B 504) and any statically linked libraries (e.g., static library 506). At a later point, such as when the executable file is loaded for execution, or dynamically during runtime, a dynamic linker 520 can perform operations to replace the dynamic library stubs that are included in the executable file 510 with a reference by which the executable file 510 may indirectly call functions in a dynamic shared library 508.

For example, object A 502 and object B 504 are compiled object files that are the output of a compiler process, which converts high-level instructions into binary data that can be executed by the data processing system. Object A 502 includes function calls to function B stored in object B 504, as well as calls to functions C and D, which are stored in a static library 506. Object B 504 includes calls to function C in the static library 506 and a call to function E in shared library 508. The linker 500 can resolve symbolic references to functions within object A 502, Object B 504 and the static library 506 at initial link time to create the executable file 510. However, the reference to function E is a stub reference that can be resolved at run time by the dynamic linker 520 to enable an indirect call to function E in the shared library 508.

In one embodiment the executable file 510 may be a legacy file that was compiled without support for signed and authenticated pointers and data. However, the shared library 508 may be a system library that is compiled with support for signed and authenticated pointers and data. The operations of method 320 shown in FIG. 3C can be used to the disabling of signing and authentication during a context switch to the process associated with the executable file 510. However, then the process attempts to execute a function loaded from the shared library 508, the system will crash without a system to enable interoperability between legacy processes and signed system libraries.

Figure 6:
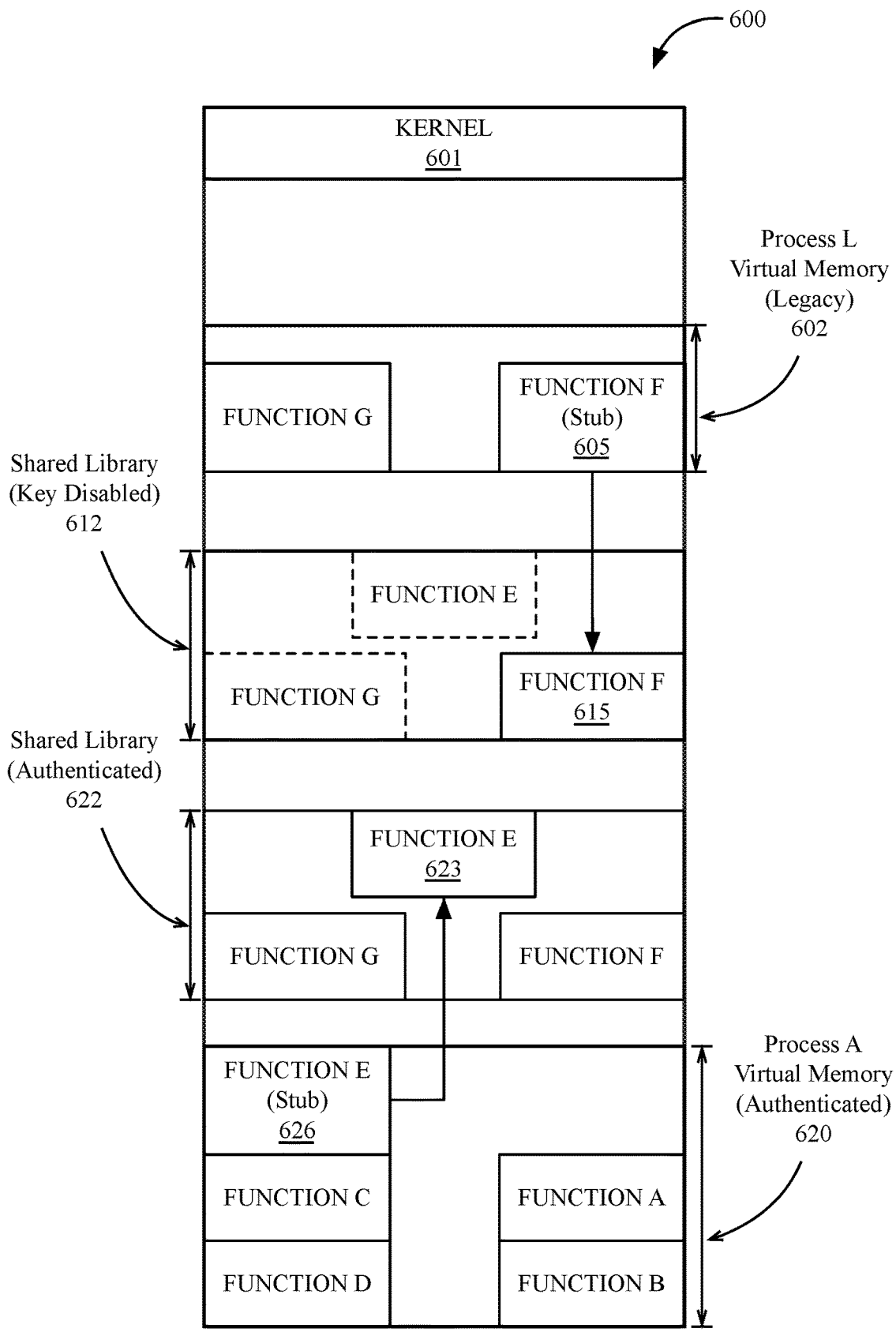
FIG. 6 illustrates a system that enables the use of signed shared libraries with legacy processes, according to an embodiment.

FIG. 6 illustrates a system 600 that enables the use of signed shared libraries with legacy processes, according to an embodiment. The system 600 shows a memory layout including an operating system kernel 601, a memory space for a legacy process 602 (Process L), a memory space for an authenticated process 620 (Process A), a memory space including an authenticated shared library 622, and a memory space for a copy of the shared library 612 in for which address signing and authentication is disabled. The specific functions, libraries, and memory space layouts are not limiting as to any one embodiment and are illustrated for exemplary purposes.

The legacy process 602 can represent third party applications that may not yet be configured to use signed pointers but are still expected to execute correctly on a platform having support for signed pointers and in which system and/or shared libraries are compiled to make use of pointer signing and authentication. A naïve solution would be to provide two copies of the system libraries, with one copy compiled to use pointer signing and authentication and with a second copy that is compiled with pointer signing disabled. However, that solution may be expensive in terms of storage and memory space and may not be suited for mobile or embedded devices with reduced memory and storage capacity. Instead, embodiments described herein provide single set of shared libraries which, on one embodiment, are consolidated into a shared library cache. By default, the shared libraries are configured to sign and authenticate pointers, return addresses, and selected data structures. However, selected portions of the same shared library can be mapped twice into virtual memory, with one instance mapped such that signatures applied to addresses associated with the shared library will be stripped and/or authentication keys will be disabled when the instance is loaded into memory. In one embodiment, when specific elements (e.g., classes, methods, objects, functions, data structures, subroutines, etc.) of a shared library are dynamically loaded by a legacy application, the element can be mapped to a separate virtual memory address. When the elements are loaded to the separate virtual memory address mapping, pointer signing can be disabled for those elements and the encryption keys used by those elements can be disabled.

As illustrated, the authenticated process 620 includes multiple functions (Function A-Function E), where the address of one or more functions (e.g., Function E (626)) of the authenticated process 620 is are stubs that are mapped to one or more addresses (e.g., Function E (623)) associated with an authenticated shared library 622. The legacy process 602 can also include multiple functions (Function F-Function G), where the address of one or more functions (e.g., Function F (605)) are stubs that are mapped to one or more addresses (e.g., Function G (615)) associated with a copy of the shared library 612. The copy of the shared library 612 includes only those elements that are loaded by legacy functions. Accordingly, the specific elements of the copy of the shared library 612 that are loaded in memory can differ from the elements of the authenticated library 622 that are loaded in memory.

In some embodiments the signing and authentication hardware of the processor can be configured to make use of multiple keys when signing and authenticating pointer values, return addresses, and data. Specific keys can be assigned to specific purposes. For example, specific keys can be used for instructions, while a different set of keys can be used for data. Furthermore, some keys can be context specific keys, while other keys may be global keys. In one embodiment, specific keys can be used for shared libraries, such that when a key-disabled copy of an element of a shared library is loaded into memory, the keys used by that specific library, or specific elements of that specific library, are disabled in the processor, while other keys that are used for other purposes can remain enabled. Additional information on encryption keys used by some embodiments is provided with respect to FIG. 7A-7B below.

Figure 7A:
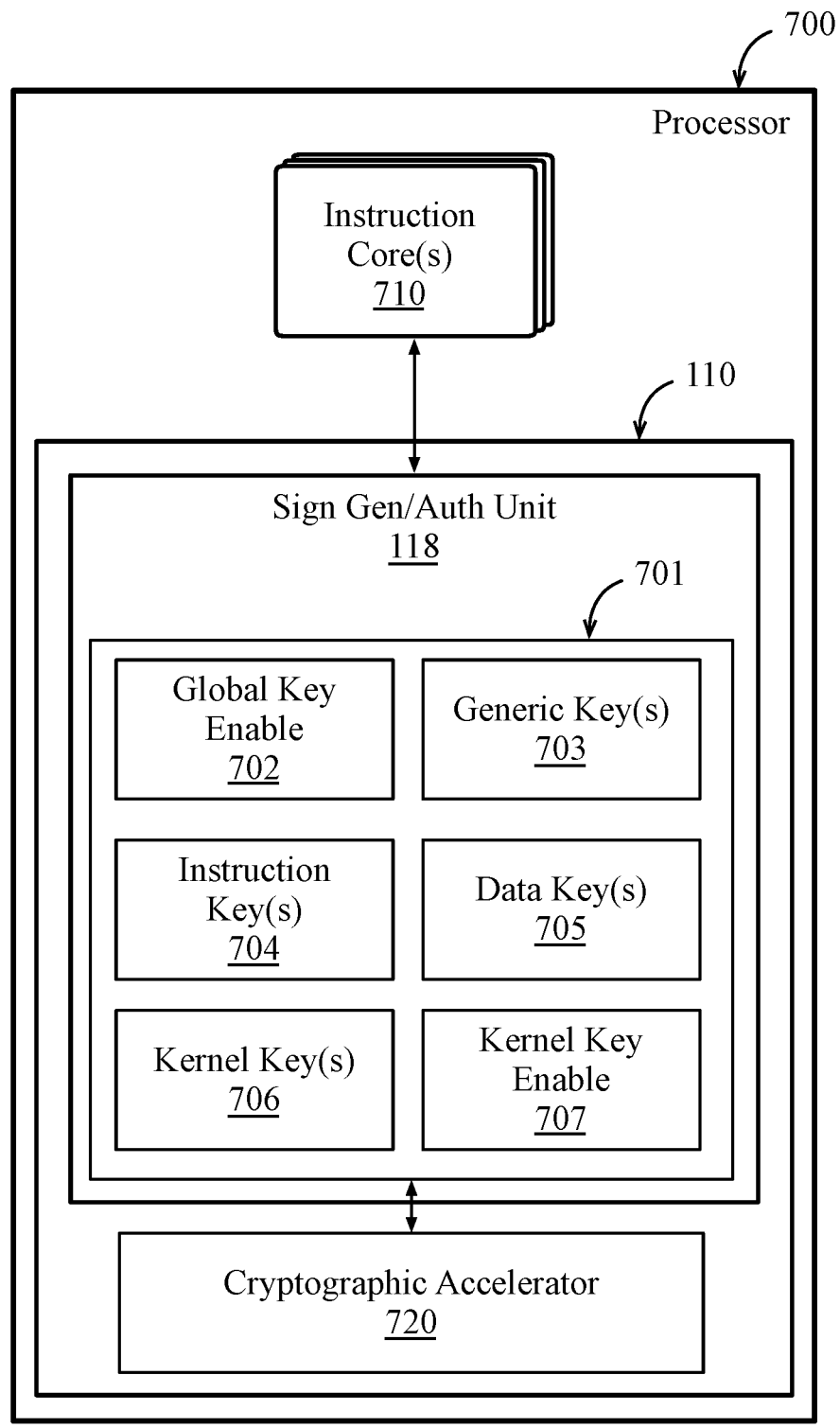
FIG. 7A-7B illustrates a processor and SOC key domains, which include multiple secret keys in various embodiments.
Figure 7B:
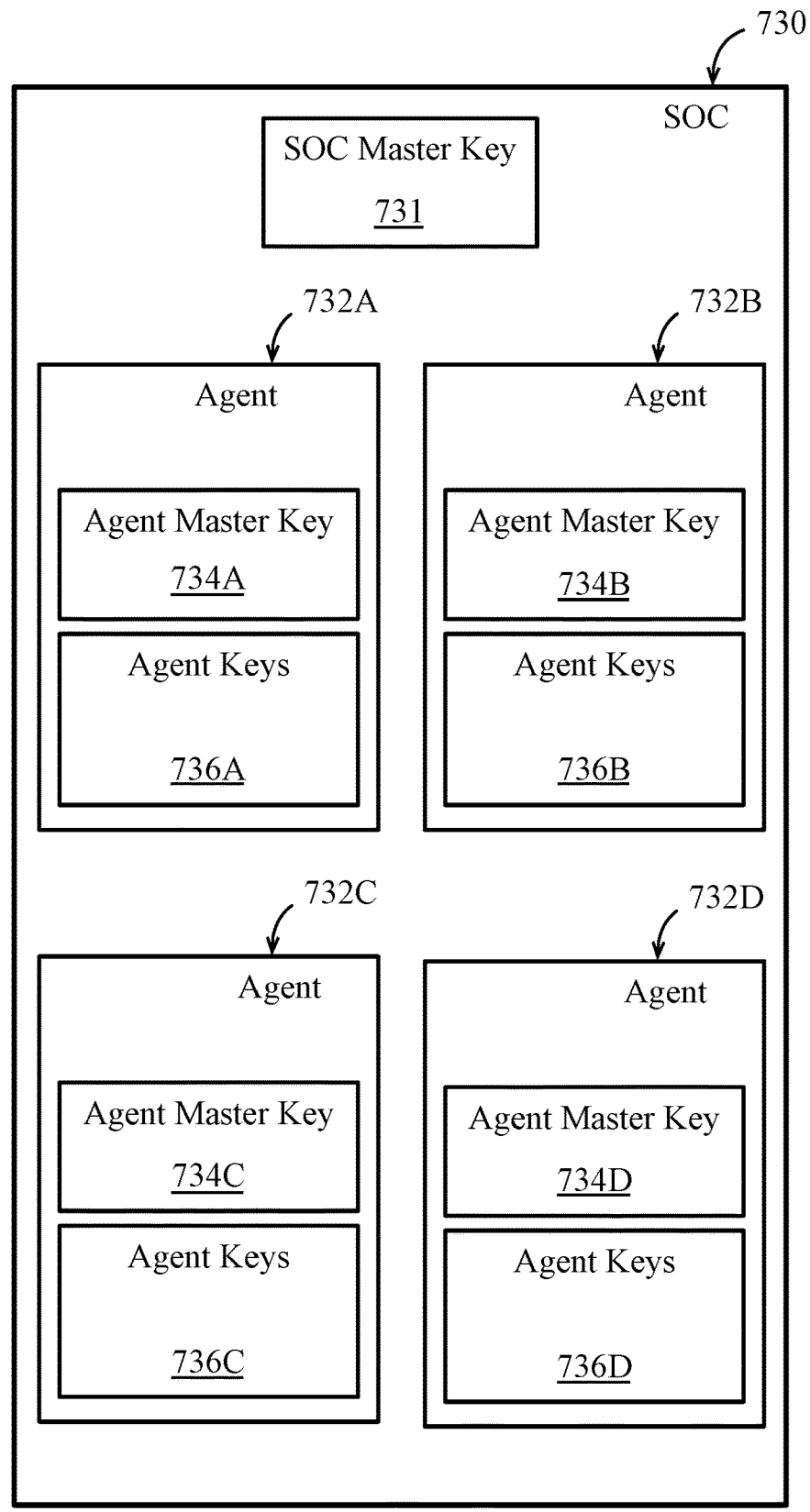

FIG. 7A-7B illustrates a processor 700 and SOC 730 key domains, which include multiple secret keys in various embodiments. FIG. 7A illustrates a processor 700, which can be a variant of processor 100 of FIG. 1. The processor 700 can include multiple instruction cores 710, with at least one instruction code being similar to execution core 110 of processor 100. In one embodiment, the signature generation and authentication unit 118 of execution core 110 includes a key block 701. In one embodiment one or more keys within the key block 701 can be encoded directly into hardware of the processor 700 or can be derived based on a master secret key that is embedded into the hardware of the processor. Based on the configuration of the processor 700 and the signature generation and authentication unit 118, the one or more of the keys in the key block 701 can be read and written by high privileged processes, such as kernel processes, but cannot be read by user mode software.

In one embodiment, the key block 701 includes but is not limited to key enable switches 702 that can be used to enable or disable specific keys used for signing and authentication by the processor 700. In such embodiment, some or all of the individual keys can be enabled or disabled in a fine-grained manner. The individual keys include, but are not limited to one or more generic keys 703, one or more instruction keys 704, one or more data keys 705, and one or kernel keys 706. In some embodiments, one or more keys cannot be disabled and are always in use. For example, in one embodiment at least one of the generic keys 703 cannot be disabled. In one embodiment, a kernel key enable 707 is also present, which can separately enable or disable the use of the kernel keys 706.

In one embodiment, the instruction set architecture of the processor 700 favors the use of the instruction keys 704 when adding signatures to instruction pointers and favors the use of the data keys 705 when adding signatures to data pointers. In one embodiment, the generic keys 703 are favored by the instruction set architecture when generating independent arbitrary signatures.

In one embodiment, the signature generation and authentication unit 118 couples with or is otherwise in communication with a cryptographic accelerator 720 that can be used to perform or accelerate cryptographic operations that are used to derive keys of the key block 701 and to sign and authenticate addresses using the keys of the key block 701. The cryptographic accelerator 720 can be present in each execution core 110. In other embodiments, the cryptographic accelerator 720 can be a separate processor core coupled with the execution core via an intra-processor bus or can be a separate multi-core processor that is coupled with the illustrated processor 700 via an inter-processor bus. In one embodiment the cryptographic accelerator 720 is, or is included within a secure processor, such as a secure element or secure enclave processor.

In one embodiment, instruction keys 704 and data keys 705 can be used to sign addresses associated with instruction addresses or data addresses respectively. Instruction keys 704 and data keys 705 can include global keys that are used to sign addresses that can be accessed by any process having access to the proper key or can be context specific, such that a signature generated with a context specific key can only be authenticated by the same software context. In one embodiment, generic keys 703 can be used to sign arbitrary data, which can be pointer values, return addresses, data addresses, or other data. In one embodiment, signatures generated using the generic keys 703 can be stored separately from the addresses or data upon which the signature is based, rather than being embedded within a pointer, as with instruction keys 704 and data keys 705. For example, a signature for a data structure can be generated and written to a signature field within the data structure, while a pointer to the data structure can be separately signed by one of the data keys 705.

In one embodiment, any signature generated by a kernel process automatically makes additional use of one or more kernel keys 706, in addition to any of the generic keys 703, instruction keys 704, or data keys 705 that may also have been used to generate the signature. The kernel keys 706 are used to differentiate signatures generated by user mode processes from signatures generated by kernel mode processes, such that if an attacker can somehow hijack a user mode process and cause it to generate a signature, that signature will still be considered invalid to the kernel. For example, one or more kernel keys 706 can be XORed with any other keys that will be used to generate or authenticate a signature and the combined key can be provided to the cryptographic function that generates or authenticate a signature. Other techniques can also be used. For example, one or more kernel keys 706 can be used to diversify an additional key when derivative keys are generated for use in signature generation and authentication for addresses or other data.

In one embodiment, the kernel key enable 707 is provided to allow a kernel mode process to manually disable the use of the kernel keys 706. In such embodiment, when a context switch is made to a kernel mode process and the execution level of the processor is raised, the kernel key enable 707 is automatically switched on. For a kernel mode process to generate a signature that is intended to be valid in user mode, the kernel mode process can automatically disable the kernel key enable 707 before the signature is generated or authenticated.

As described above, in one embodiment one or more keys within the key block 701 can be encoded directly into hardware of the processor 700 or can be derived based on a master secret key that is written into the hardware of the processor on boot. FIG. 7B illustrates an SOC 730 (system on a chip integrated circuit) having multiple agents (e.g., processors), which each have separate key domains. In one embodiment, the SOC 730 includes an SOC master key 731, which is a hardware key that is unique per-boot cycle. The SOC master key 731 is written to write-only memory at boot and is not visible to software at runtime. The SOC master key 731 can be used by each agent 732A-732D to derive an agent master key 734A-734D. Derivation of the agent master keys 734A-734D can be performed by applying a key derivation function to the SOC master key 731, along with some additional input. In one embodiment, the additional input can be an identifier for a key domain associated with the agent associated with the agent master key to be generated. Any number key derivation functions and techniques can be used. In one embodiment, the agent master keys 734A-734D are derived from the SOC master key 731 at boot time and the keys may be different each boot cycle. In one embodiment, each agent master key 734A-734D is a physical copy of a single logical agent master key that is shared by all agents.

The agent master keys 734A-734D can be used to generate agent keys 736A-736D. In one embodiment, each agent 732A-732D is an application processor within the SOC 730, although it is possible for address signature generation and authentication for other types of processors. For example, each agent 732A-732D can be an instance of the processor 700 or one of the processor cores 710 of FIG. 7A. The agent keys 736A-736D for each agent can include the keys of the key block 701 illustrated for execution core 110. As with the keys of the key block 701, some of the agent keys 736A-736D within each agent can be global keys, while other keys are context specific keys. Some of the agent keys 736A-736D can be dedicated for use with instruction addresses, while others can be dedicated for use with data addresses. Some of the agent keys 736A-763D can be generic keys that are used to sign generic data. The agent keys 736A-736D can be enabled or disabled on a per-agent basis, or individual keys can be enabled or disabled. In one embodiment, the agent keys 736A-736D can include keys that are dedicated for use by specific execution levels of the agents. Furthermore, the agent keys 736A-736D include one or more kernel specific keys that are automatically enabled for kernel mode processes and can be manually disabled by a kernel mode process. In one embodiment, corresponding agent keys 736A-736D, can be configured to be the same across all agents 732A-732D and are derived from physical copy of the same logical key. However, in one embodiment one or more of the agent keys 736A-736B can be configured to be agent specific keys that can be used to generate signatures that can be authenticated only by the same agent. For example, a secure processor, such as a secure element or secure enclave processor, can be one of the agents 732A-742B and can have a set of agent specific keys. The secure processor can execute a separate, secure processor operating system to manage processes that execute on the secure processor. The secure processor can support signing and authentication instructions described herein, and processes that execute on the secure processor can implement address and data signing techniques described herein. In one embodiment, processes that execute on the secure processor do not share keys and each process uses process-specific keys to perform signing and authentication.

Figure 8:
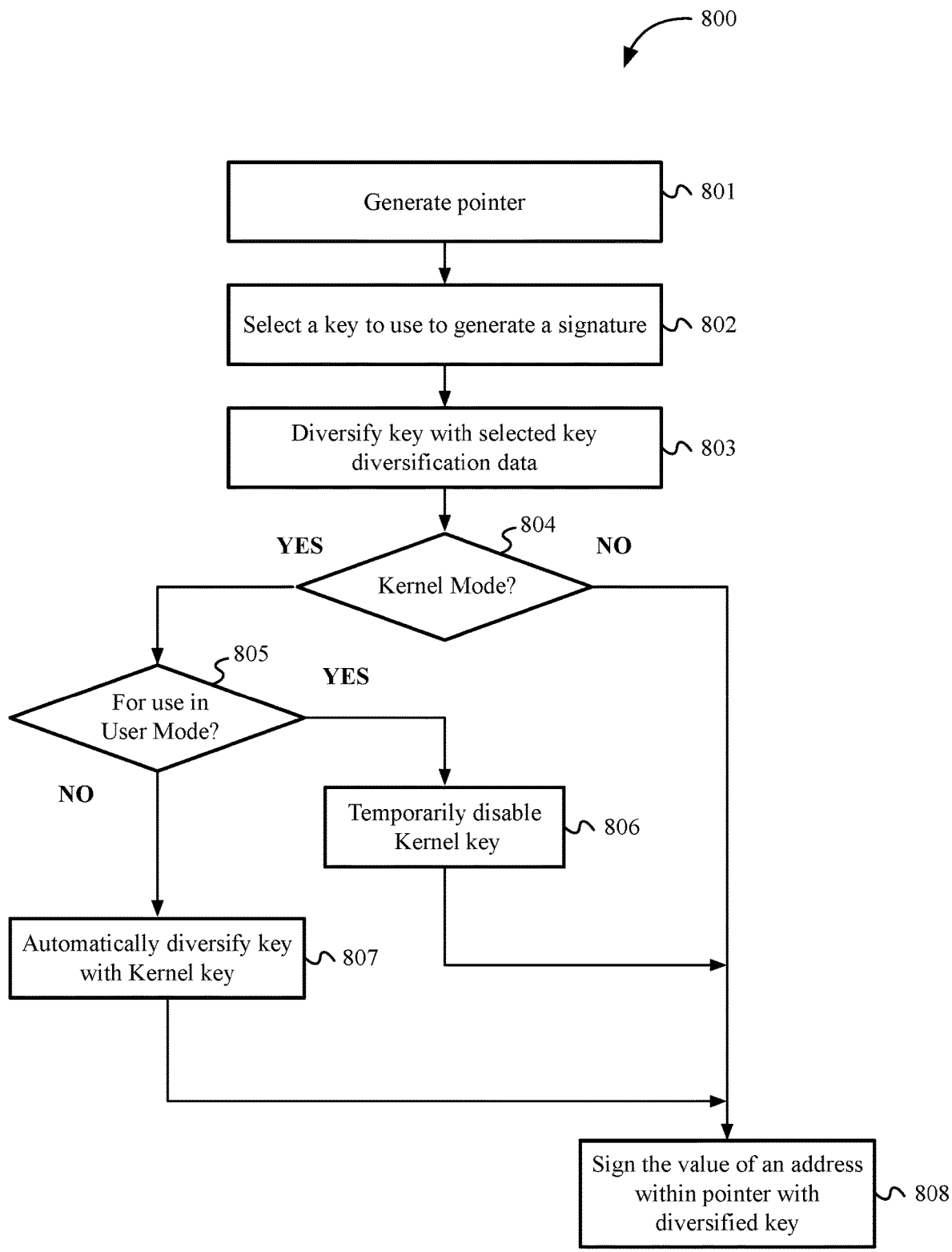
FIG. 8 illustrates a method of runtime key diversification, according to an embodiment.

In addition to agent specific key domains, runtime key diversification techniques can be used when generating keys for signing and authenticating, as illustrated in FIG. 8.

FIG. 8 illustrates a method 800 of runtime key diversification, according to an embodiment. Runtime key diversification can be performed by processes that generate signatures to further harden the generated signatures to attack. Different processes can use different diversification techniques, with user mode processes using different techniques than kernel mode processes.

Method 800 begins when a process is to generate a pointer (block 801) for a function, return address, indirect jump, data structure, or another pointer that uses an address signature. Method 800 additionally includes selecting a key to use to generate a signature for the pointer (block 802). Method 800 further includes to diversify selected key with key diversification data (block 803).

The key diversification data used can vary, as can the technique used to diversify the key. For example, a key and key diversification data can be provided to a key derivation function. In one embodiment, the diversification data can be XORed with the selected key. When authenticating a signature, the same key diversification data used to generate the signature is used to authenticate the signature. Diversification can be performed in multiple different ways. Address diversification can be used in which the signature is diversified with its address. Any address-diversified signed pointer that was previously stored at a given address can be replayed at that same address. Type diversification can also be used, in which the signature is diversified according to a type hierarchy of the pointer or the class to which the pointer belongs. Alternatively, no diversification can be used, which allows un-diversified pointers that are signed with the same key to be freely substituted for each other. In one embodiment, where the same key is used with the same diversification data for different use cases, an additional pointer mangling operation can be applied that modifies the address to be signed in some pre-determined manner. Different mangling operations, or a different mangling value, can be used to distinguish the use cases. The mangling operation can be reversed before authentication.

The use of different types of diversification enables fine-grained control flow integrity that minimizes the number of branch targets that will be considered valid at a given branch site. Additionally, different diversification techniques can be used to restrict the execution of certain types of code to certain execution domains. For example, code generated by a just-in-time (JIT) compiler may be restricted such that signatures generated by that code will only be considered valid by other JIT compiled code.

In one embodiment, method 800 additionally includes determining whether the process is a kernel mode process (block 804). If the process is not kernel mode process (block 804, "no") (e.g., a user mode process), method 800 includes for the process to sign the address of the pointer with the diversified key (block 808). If the process is a kernel mode process (block 804, "yes"), method 800 includes for the processor to determine whether the pointer is for use in user mode (805). If the pointer is for use in user mode (block 805, "yes"), method 800 includes for the processor to temporarily disable the kernel key (block 806), for example, by disabling the kernel key enable 707 shown in FIG. 7A, which in one embodiment is automatically enabled for kernel mode processes. If the pointer is not for use in user mode (block 805, "no"), for example, if the pointer will be used by a kernel mode process, the processor can automatically diversify the signing key with the kernel key (block 807). After either of block 806 or block 807, method 800 includes for the processor to sign the address of the pointer with the diversified key (block 808), which is diversified at block 803 and may be additionally diversified at block 807.

In one embodiment, some signing and authentication use cases have dedicated keys, while some keys are used for multiple related use cases. Furthermore, some types of keys can have subsets that are available only in higher-privileged execution levels. For example, a first set of keys may be made available to processes that execute at the lowest execution level, such as user mode processes, while processes that execute at a higher-privileged execution level, such as kernel mode processes, may have access to the first set of keys and an additional second set of keys. In one embodiment, a higher execution level process uses higher execution level keys by default and can selectively enable or disable the keys used for lower execution level processes, for example, to generate signatures that can be authenticated as valid by lower execution level processes. However, some processor operations are disabled when a higher execution level process enables the use of lower-level keys. For example, in one embodiment a high execution level process cannot be interrupted while lower-level keys are enabled. In one embodiment, the set of higher execution level keys are in addition to and separate from the one or more kernel keys that are automatically enabled when a kernel process is executing.

Figure 9A:
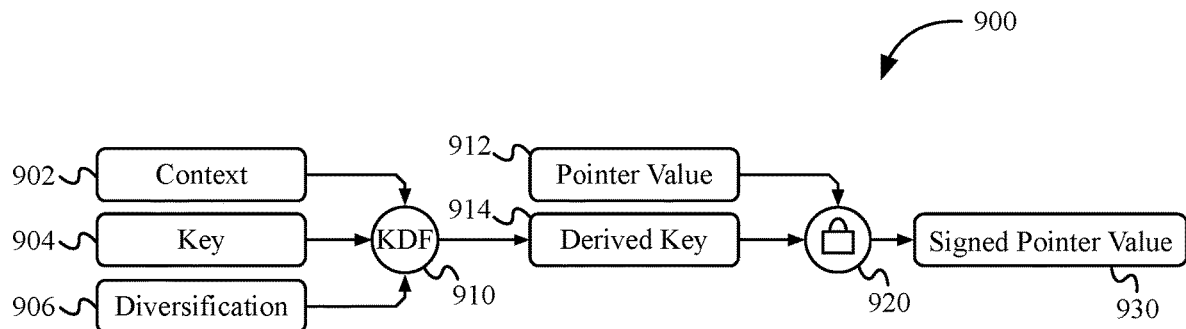
FIG. 9A-9C illustrates systems for key diversification and data structure protection, according to embodiments described herein.
Figure 9B:
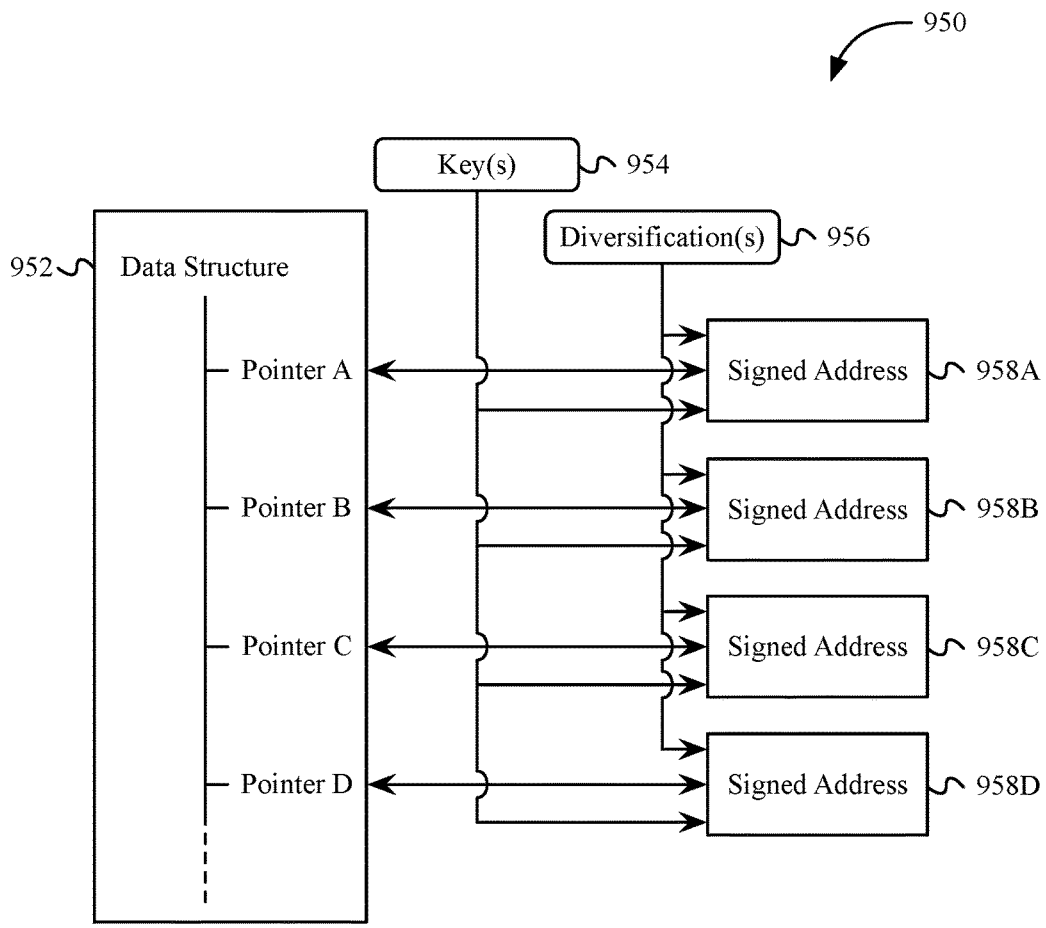
Figure 9C:
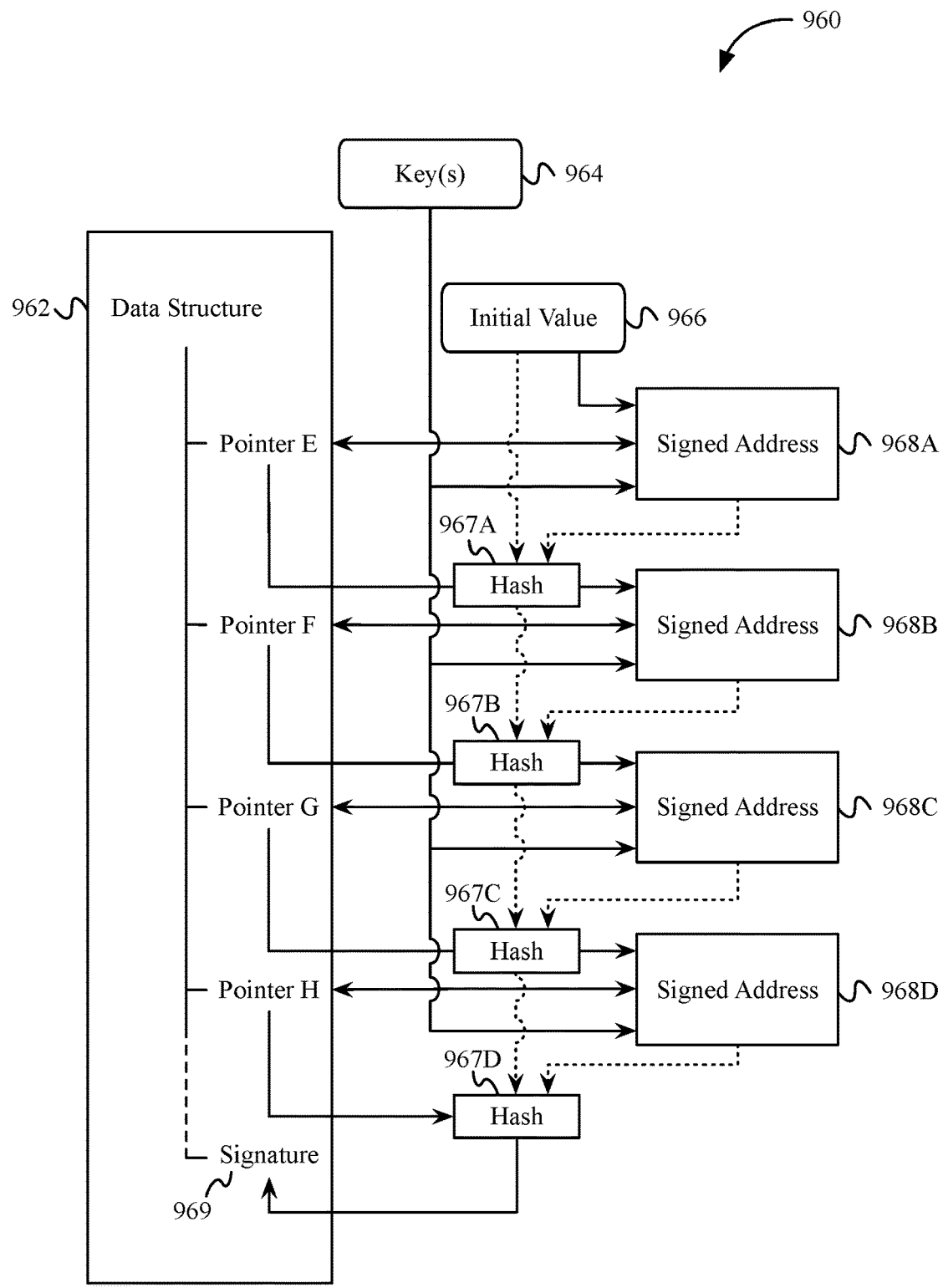

FIG. 9A-9C illustrates systems for key diversification and data structure protection, according to embodiments described herein. FIG. 9A illustrates a key derivation system 900 for use by a signature generation and authentication unit as described herein. FIG. 9B illustrates a system 950 that uses diversified keys to protect the contents of data structures stored in memory. FIG. 9C illustrates a system 960 to sign key data structures to prevent forgery in data-only attacks.

As shown in FIG. 9A, the key derivation system 900 includes a key derivation function (KDF 910) which, in one embodiment, accepts a context 902, key 904, and diversification data 906 as input and outputs a derived key 914. In one embodiment the key 904 can be a master key, such as an SOC master key 731 or agent master key 734A-734D as in FIG. 7B. The derived key 914 can by any one of the agent keys 736A-736D, including one or more of the keys of the key block 701 of FIG. 7A. The derived key 914 can be applied to a pointer value 912 via a cryptographic algorithm 920 to generate a signed address 930. The signed address can be appended to an address to generate a signed address. Alternatively, the signed address can instead be a generic signature that is stored to a signature field of a data structure, as described further in FIG. 9C below.

As shown in FIG. 9B, a system 950 of diversified keys can be used to protect the contents of data structures stored in memory. Exemplary data structures that can be protected include thread state structures of sleeping or waiting threads stored in memory while those threads are suspended. When a thread is in a sleeping or waiting state, or when an interrupt or exception occurs during execution of a thread, a thread state for the thread can be stored in memory. The thread state can include details such as the execution state (e.g., register values) of the thread and the program counter or instruction pointer associated with the thread. When a thread is sent to sleeping or waiting state, sensitive portions of the thread state can be signed by the processor before the thread state is stored to memory. When the thread is resumed, those pointers of the thread state can be authenticated to ensure that the thread state has not been manipulated while the thread was in the waiting or sleeping state. Once the thread state is authenticated, the thread state can be restored to the processor and thread execution can be resumed.

In addition to pointers in saved thread state, function pointers in data structures can also be protected. For example, function pointers in a method list, pointers to code blocks, or pointers within a method cache can be protected.

In one embodiment, the system 900 includes a data structure 952 to be protected, where the data structure includes multiple pointers (Pointer A-Pointer D). The pointers can be function pointers, pointers to data, or any other type of pointer. In one embodiment the pointers store execution state, including register values. Exemplary register values include the link register (LR), frame pointer (FP), stack pointer (SP), program counter (PC), and the current program status register (CPSR). Some or all of the exemplary register values can be signed when stored to memory and authenticated before being restored to the processor.

The system 900 additionally includes one or more keys 954. In one embodiment, a single key can be used to sign each pointer. In one embodiment, a different key is used to sign each pointer. In such embodiment, specific keys can be associated with different pointers. Additionally, one or more diversifications 956 can be used to diversify the keys used to sign the addresses of the pointers. In one embodiment the diversification is performed at runtime using constant or context specific data. The keys 954 and diversifications 956 can be used to generated signed addresses 958A-958D for the pointers, where the signature is integrated into the pointer value, for example, in the manner illustrated by the M-bit memory location or register 220 of FIG. 2.

In one embodiment, the specific keys that are associated with specific pointers, and the specific diversification data used on those keys, can be codified and versioned. For a given pointer authentication ABI version, the specific pointers, keys, and diversification data that will be used by system libraries can be specified. Third party programs with support for address and data signing and authentication can determine which pointers to sign, and how to sign those pointers, based on the pointer authentication ABI version. Third party binaries that are compatible with older and out-of-date versions can be conditionally degraded. Additionally, program code can be future-proofed by configuring the program code to support pointer authentication ABI versions that have been published but are not yet enabled. Program code will continue to operate in the manner specified by a current ABI version, then behavior can be seamlessly switched to the new ABI version when that version becomes active on a system. Additional details on pointer ABI versioning is described below with respect to FIG. 11 and FIG. 12.

As shown in FIG. 9C, a system 960 of key signing can be applied to data structures to prevent forgery in data-only attacks. A chain of authenticated pointers (Pointer E-Pointer H) can be used to prevent the replacement of any one pointer in a list of pointers within a data structure 962 due to the interdependence of the signatures generated for pointer values. While four pointers are illustrated, the chain can include any number of pointers. In one embodiment, a signature 969 is applied to a field within the data structure 962 as an additional mechanism for authentication. A set of one or more keys 964 can be used to generate signatures that are used to generate the signed addresses 968A-968D for the pointers, with an initial value 966 to be used as key diversification or key whitening data. In one embodiment, the initial value 966 is a pre-determined constant value that is known to processes that will authenticate the data structure 962. For example, the initial value 966 can be the virtual address of the data structure 962.

An initial signed address 968A can be generated for a first pointer (Pointer E), where one of the one or more keys 964 used to generate the signed address 968A is diversified or whitened using the initial value 966. A set of hash functions 967A-967D can then be used to generate diversification or key whitening data when generating the subsequent signed addresses 968B-968D. For example, a hash value can be derived by applying a hash function 967A to the address of the first pointer, the signed address 968A generated for the first pointer, or some combination of the first pointer and the first signed address 968A. The resulting hash value can then be used as an input to the cryptographical algorithm that is used to generate the signed address 968B of the second pointer (Pointer F). In one embodiment, the hash value used to generate the second signed address 968B may also be derived in part based on the initial value 966 or some pre-determined modification of the initial value. The cycle can continue for each successive pointer (Pointer G, Pointer H, etc.) and for each successive signed address (signed address 968C, signed address 968D, etc.), where the signed addresses are generated based on a pointer value, a key, and a hash value that is derived based on a specified combination of the previous pointer, the signed address of the previous pointer, or the hash value used to generate the signed address of the previous pointer. The specific formula used to protect a given data structure may vary based on the pointer authentication ABI version and can be periodically changed. After signed addresses are generated for each pointer, or a pre-determined subset of the pointers in the data structure 962, the signature 969 is generated based on using a hash function 967D and some pre-determined combination of the previously signed pointer, the signed address for the previously signed pointer, or a hash value used to generate the signed address of the previously signed pointer. This chain of signature generation can be used to prevent the replacement of any specific signed pointer with a signed pointer from a different data structure, as the replacement or modification of any one pointer, even a pointer with what may otherwise be a validly generated signature, will be detected during authentication due to the interdependence of the signatures used within the data structure 962.

Exemplary data structures that can be protected using the techniques of FIG. 9A-9C are shown in Table 1 and Table 2 below. Table 1 illustrates an exemplary jump buffer that can be used by a setjmp, longjmp instruction combination. Table 2 illustrates an exemplary thread state structure. The data structures shown are exemplary and not limiting as to all embodiments, as the jump buffer and thread state structures can vary across platforms and processor architectures. Each structure stores execution state information in memory that an attacker may attempt to manipulate to change the control flow of an executing thread.

TABLE 1

Jump Buffer for Setjmp/Longjmp Commands

```
typedef struct jmp_buf {
    void * lr;        /* Link Register */
    void * sp;        /* Stack Pointer */
    void * fp;        /* Frame Pointer */
    void * spsr;      /* Saved Program Status Register */
    long regs[8];     /*Callee-saved registers */
}
```

The exemplary jump buffer shown in Table 1 contains a program counter, link register, stack pointer, saved program status register, and additional execution state registers. The setjmp instruction can sign selected values of the jump buffer when saving a jump location and execution state, while the longjmp instruction can authenticate selected values when loading from the jump buffer. In one embodiment, only a subset of the registers of the jump buffer are signed and authenticated, for example, the subset of the set of registers that considered sensitive because they are return addresses or point to areas of memory that contain return addresses. For example, some combination of the program counter, link register, stack pointer, frame pointer, and/or saved program status register can be signed.

In one embodiment, each register value is signed independently using a selected key and diversified using selected data. For example, one of the instruction keys 704 of FIG. 7A can be used to sign the link register, while the one of the data keys 705 can be used to sign the other sensitive registers. The signatures used to sign the register values can be generated using the value of one of the registers as diversification data. In one embodiment, a constant value is used as diversification data to generate the signature for the stack pointer value, and the value of the stack pointer is used as diversification data for the other sensitive registers. In one embodiment, context specific versions of the instruction key and data key are used to sign the registers of the jump buffer, such that only a thread executing under the same context can validly authenticate the generated signatures.

TABLE 2

Thread State Structure

```
_STRUCT_THREAD_STATE64
{
    void * x[29];              /* General purpose registers */
    void * opaque_fp;          /* Frame pointer */
    void * opaque_lr;          /* Link register */
    void * opaque_sp;          /* Stack pointer */
    void * opaque_pc;          /* Program counter */
    uint32_t cpsr;             /* Current program status register */
    uint32_t opaque_flags;     /* Flags describing struct format */
};
```

The exemplary thread state structure shown in Table 2, the frame pointer, link register, stack pointer, and program counter are opaque to viewers unless the correct keys are used to strip the signatures from the register values. The thread state structure can be used by a thread get/set API for threads in the current process or other processes such as tools or debuggers. Additionally, the kernel may manipulate the thread state structure of a thread during exception handling. As the thread state structure may be used by multiple processes, the context independent keys can be used to sign sensitive register values. A thread that may legitimately view or modify the sensitive opaque registers can authenticate the register value, strip the signature from the register value, manipulate the values as needed, and either store the values to hardware or resign the values if the thread state is to be written back to memory. In one embodiment, diversification for the registers is performed using a string discriminator based on the name of the register, with the PC and LR register values signed using a process independent instruction key and the SP and FP registers signed using a process independent data key.

In one embodiment, the opaque_flags field replaces padding data used in thread state data structures known in the art. The opaque_flags field can include flags that describe the current format for the structure. Various types of flags can be set within the opaque flag fields, including a no_ptr_auth flag and a lr_context_signed that indicates that the thread state includes unsigned register state. The no_ptr_auth flag can be set by the kernel when either a subject or receiver thread of the thread state executes with the keys used for JOP protection is disabled and no pointer authentication should be performed. The no_ptr_auth flag cannot be validly set for threads that execute with JOP protection keys enabled. The lr_context_signed flag indicates that the opaque_lr value includes a link register value that was found to already have been signed using a context specific key and was not re-signed using the context independent key. The lr_context_signed key can also be set if the link register value was determined to contain a non-pointer value, for example, if the thread was using the link register as a temporary register at the time the thread state was captured. In one embodiment, when the lr_context_signed flag is set, the value of the link register is validated to ensure that the link register value was either a non-pointer or is actually signed, to prevent an attacker from fraudulently setting the flag. The link register can be validated by executing the strip instruction on the link register. If the link register is unchanged after the strip instruction, then the link register was not actually signed and the lr_context_signed flag is ignored.

In one embodiment, a special subroutine is provided to convert a user-mode thread state to an unsigned representation that can be manipulated by the kernel. Interrupts can be disabled on the processor and while the interrupts are disabled, the user mode keys can be enabled and used to authenticate the signatures of the opaque register values. If the opaque register values authenticate, the signatures can be stripped from the register values and the unsigned values can be written to registers, where the values can be manipulated by the kernel.

The specific data structures described are exemplary and the techniques provided by embodiments described herein can be used to protect data in any data structure. Additional exemplary data that can be protected include security attributes, task virtual memory maps, code signing flags, or other data that may be tampered with by an attacker.

Figure 10A:
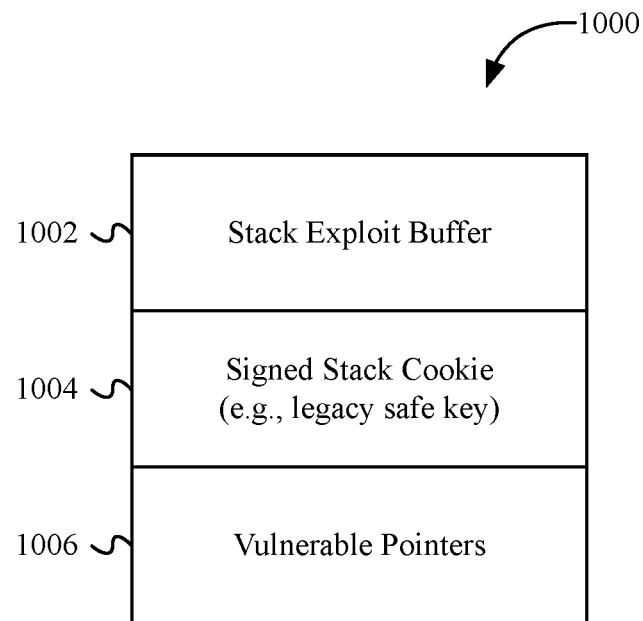
FIG. 10A-10B illustrate the use of pointer value signing to detect malicious or inadvertent memory corruption.
Figure 10B:
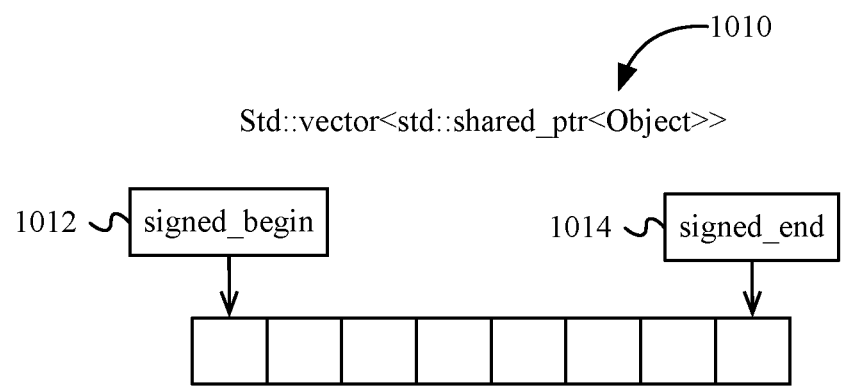

FIG. 10A-10B illustrate the use of pointer value signing to detect malicious or inadvertent memory corruption. FIG. 10A illustrates a stack 1000 including a signed stack cookie to detect a stack smashing attack to modify vulnerable pointers on a stack. FIG. 10B illustrates a data structure 1010 including memory pointers that can be signed to detect software defects that result in memory corruption.

As shown in FIG. 10A, techniques that make use of stack cookies to detect overflow attacks can be augmented via the use of signed stack cookies. The stack 1000 includes a stack exploit buffer 1002 that an attacker may use to attempt a buffer overflow attack to overwrite stack memory containing vulnerable pointers 1006 or register data, such as function pointer parameters or a subroutine return address. One countermeasure to a buffer overflow attack is to store a stack security cookie (also referred to as a canary) in front of vulnerable pointers when calling a function. Because functions write data on the stack data in a predefined order if an overflow to the stack exploit buffer occurs, the security cookie is overwritten on the way to overwriting the vulnerable pointers 1006. Before the function returns, the cookie may be checked against an authoritative version of the security cookie. If the security cookies do not match then it is assumed that the buffer has been overflowed and the process may be aborted and/or other appropriate action taken. However, it may be possible to trigger an overflow attack in a manner that spoofs the value of the conventional stack cookie.

As a countermeasure to stack cookie spoofing exploits, one embodiment provides a method to configure a subroutine prologue and epilogue such as the prologue and epilogue shown in FIG. 4B, to sign and authenticate the stack cookie that is inserted to guard vulnerable pointers on the stack. The subroutine prologue can be configured to insert the signed stack cookie 1004 onto the stack in the overwrite path between a buffer overflow (or underflow) and vulnerable pointer data stored in the stack. The epilogue can then authenticate the signed stack cookie 1004 before returning to the caller of the subroutine. The signed stack cookie 1004 is resistant to attacks that attempt to replicate the cookie value within the data used to overflow into the vulnerable pointers. Even if the value of the signed stack cookie 1004 can be predicted by an attacker, it is unlikely that the attacker will be able to apply the correct signature to the cookie.

In one embodiment the signing and authentication can be performed transparently to the program code and may be used in scenarios where ROP protection is otherwise disabled. For example, a subset of keys can be disabled while executing legacy code, but a special legacy safe key that is not otherwise used while executing legacy code can remain enabled for use in signing and authenticating stack cookies. In one embodiment, the stack cookie signature can be generated based on one or a combination of the stack pointer value, the program counter value, or other data that explicitly links the signed stack cookie with the stack frame in which the cookie is placed. Additionally, signed stack cookies may be more efficient than conventional stack cookies, the values of which, in some implementations, are generated using global data that is slower to access than the register data used to generate and sign the signed stack cookie 1004.

As shown in FIG. 10B, pointers within generic data structures can be signed as a general mechanism for memory integrity protection. Specifically, signed pointers can be used in certain data structures detect the presence of memory corruption bugs that may be unrelated to malicious attacks. For example, the std::vector template data structure 1010 can be modified to use a signed begin pointer 1012 and signed end pointer 1014, which can be used to detect the occurrence of memory corruption bugs. Pointer signing can be used to detect memory corruption in other similar data structures and is not limited to the illustrated std::vector template data structure 1010. Any stack-based or dynamically allocated data structure can use signed memory bounds pointers to detect potential memory corruption within or adjacent to the data structure.

When signed boundary pointers such as the signed begin pointer 1012 and signed end pointer 1014 are used, a memory write that causes an overflow or an underflow of the data structure will overwrite the boundary pointers. Before data within the data structure is access, one or more boundary pointers for the data structure can be validated. If either boundary pointer of the data structure is invalid, data within the data structure may have been corrupted by a software defect or a malicious attack. In addition to edge boundary pointers, pointers within the data structure can be signed. In one embodiment, additional pointers that are otherwise unused can be inserted into a data structure and signed. As the boundary pointers are otherwise unused, operating system data structures that are accessed by legacy processes may also use signed boundary pointers, where the boundary pointers are signed and authenticated using legacy safe keys.

In one embodiment the addresses referenced by the boundary pointers can be set to a known value, such as a value associated with the address of the data structure, a value associated with the address of the boundary pointer, or a context identifier of the current process. In addition to signature validation, the address value stored in the boundary pointer can be verified.

Figure 11:
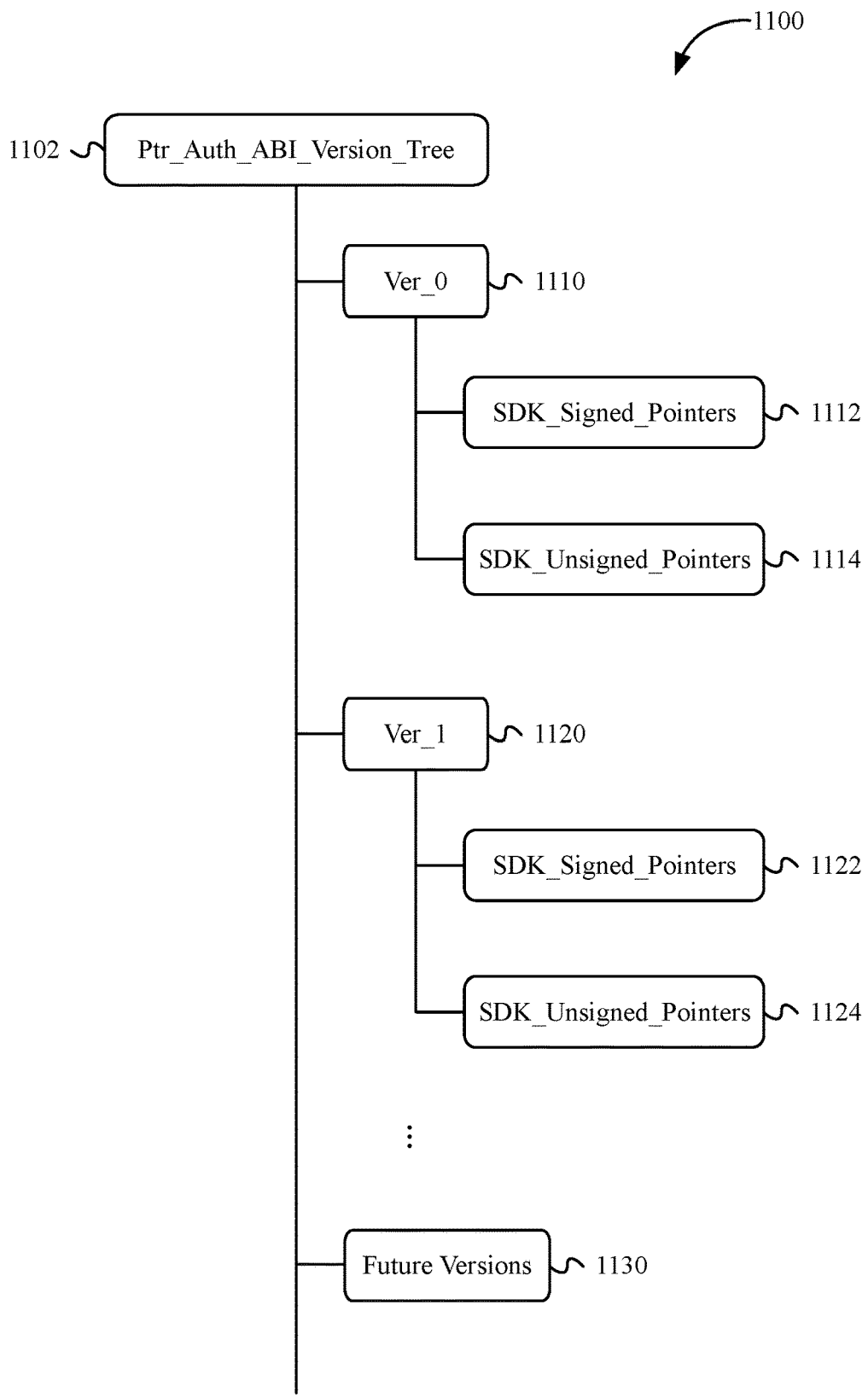
FIG. 11 illustrates a system of pointer authentication ABI versioning, according to an embodiment.

FIG. 11 illustrates a system 1100 of pointer authentication ABI versioning, according to an embodiment. A pointer authentication ABI versioning scheme can be used to enable the specific details of the signed or unsigned elements of system libraries to change between revisions of an operating system. For example, a pointer authentication ABI version tree 1102 can be defined in which, for each ABI version, the specific set of structures in a software development kit (SDK) that contain signed or unsigned function pointers.

For example, a first SDK version (Ver_0 1110) with support for signed pointers can specify a specific set structures in the SDK that contain signed pointers (SDK_Signed_Pointers 1112) and a specific set of structures in the SDK that contain unsigned pointers (SDK_Unsigned_Pointers 1114). Changing the set of structures in the SDK that contain signed function pointers (or other types of signed pointers) is an ABI breaking change, and generally would only occur during operating system revisions. However, should an exploit be discovered and applied against an existing pointer authentication ABI version, or another event occurs that warrants an ABI change, it would be desirable to be able to revise the ABI version and push a hotfix without requiring a major software version update.

Thus, a second SDK version (Ver_1 1120) can be published that specifies a different set of signed pointers (SDK_Signed_Pointers 1122) and a different set of unsigned pointers (SDK_Unsigned_Pointers 1124) that are used within data structures provided by the SDK. In addition to changing the pointers that are signed or unsigned, the way the pointers are signed can change. For example, between pointer authentication ABI versions, different keys and/or different diversification or key whitening data can be specified for use when signing and authenticating pointers, data structures, or other SDK elements that can be signed and authenticated. Execution of system binaries with a pointer authentication ABI mismatch can be disallowed, as the pointer authentication ABI version of system binaries and libraries should always match. A mismatch in pointer authentication ABI between a system binary and a system library may suggest that the system is has been compromised.

In one embodiment, third-party applications designed and compiled with support for pointer authentication be compiled against a specific pointer authentication ABI version. If a third-party application is executed on a system with a mis-matched pointer authentication ABI, address signing can be disabled for that application, allowing the application to execute without crashing, although the application may execute in a slightly less secure state. For third-party applications that are delivered via an online application and media store, some embodiments provide techniques to dynamically compile and deliver a version of the application that matches the pointer authentication ABI version of a target device.

Figure 12:
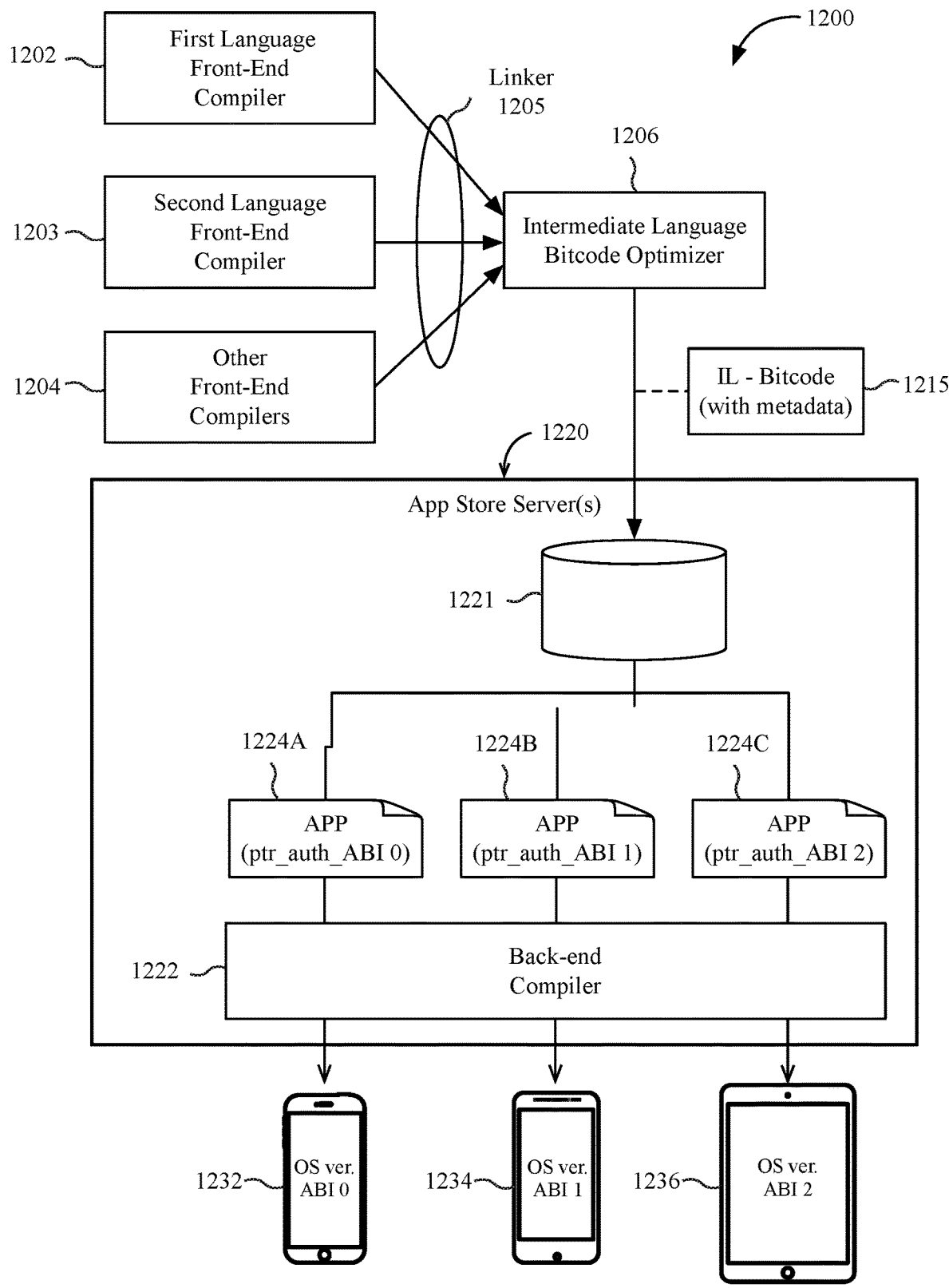
FIG. 12 illustrates a system of dynamic pointer authentication ABI versioning via bitcode, according to an embodiment.

FIG. 12 illustrates a system 1200 of pointer authentication ABI versioning via bitcode, according to an embodiment. In one embodiment, dynamic pointer ABI versioning can be enabled for third-party applications that are submitted in a bitcode format. Such applications can be dynamically compiled for the target OS and pointer version on which the application will be executed.

For example, a developer can develop an application using one or more programming languages and compile the application with a modular compilation toolchain including one or more front-end compilers (e.g., first language front-end compiler 1202, second language front-end compiler 1203, other front-end compilers 1204) and linked by a linker 1205. The linker 1205 can communicate with an intermediate language bitcode optimizer 1206 that outputs an intermediate language bitcode 1215. The application can then be provided to one or more application store servers 1220 in the form of the intermediate language bitcode 1215 instead of a fully compiled version. The intermediate language bitcode 1215 can then be stored to non-volatile memory 1221 within or coupled with the application store servers 1220.

In one embodiment, the intermediate language bitcode 1215 includes embedded metadata that allows the app store servers 1220 to generate bitcode for the set of signed pointers in multiple ABIs, allowing pointer signing and authentication to remain enabled even when back deploying to older devices. For example, the app store servers can use the embedded metadata to generate application bitcode 1224A-122C that represents different versions of the same application, with the different versions having support for different pointer authentication ABI versions. The different bitcode can then be compiled by a back-end compiler 1222 and provided to different devices (e.g., device 1232, device 1234, device 1236), where the different devices each have different operating system versions or otherwise require different pointer authentication ABI versions to enable pointer signing and authentication.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 13:
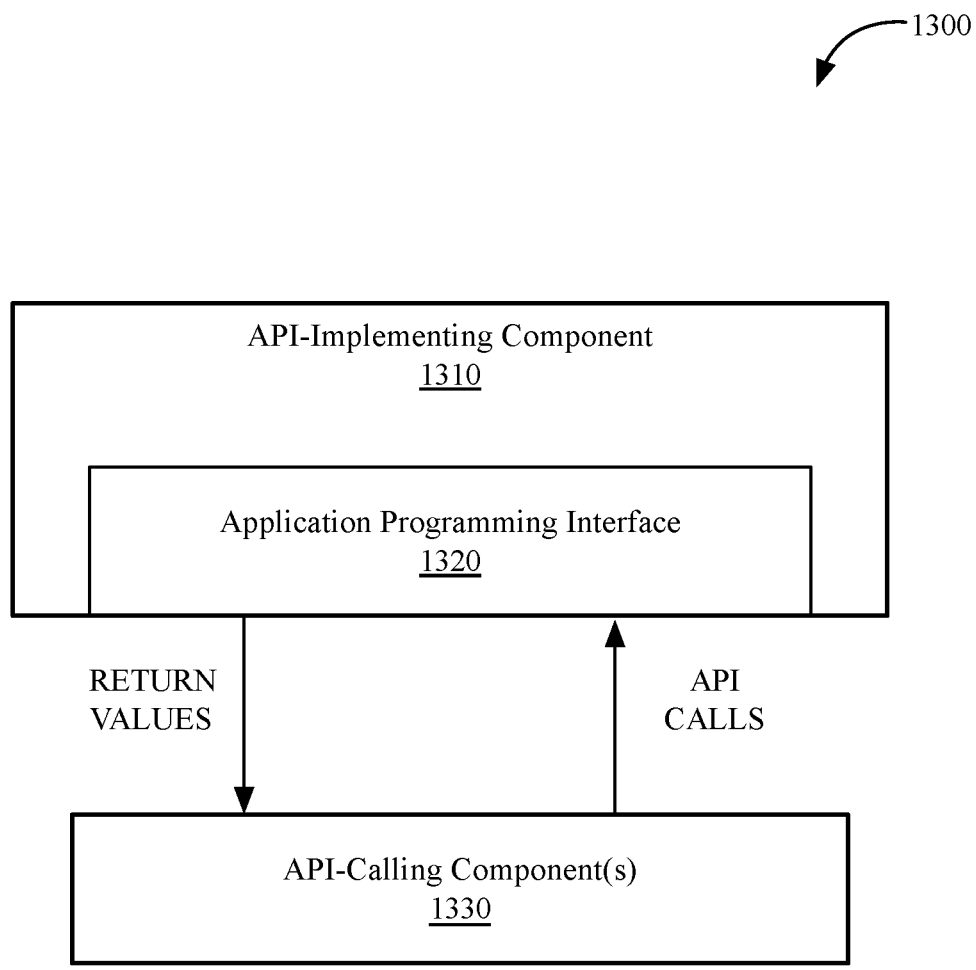
FIG. 13 is a block diagram illustrating an exemplary API architecture, which may be used in some embodiments.

FIG. 13 is a block diagram illustrating an exemplary API architecture, which may be used in some embodiments of the invention. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 14A:
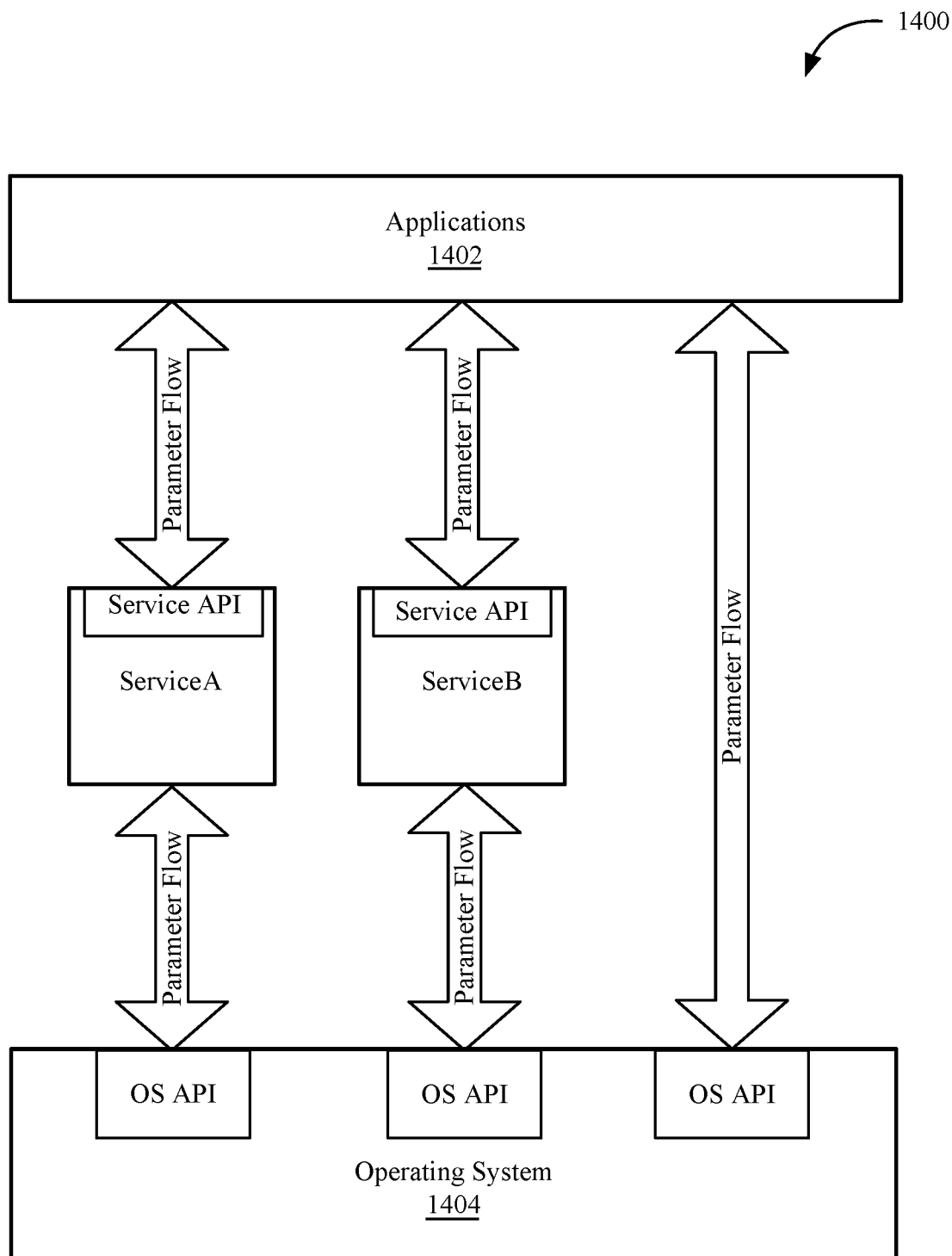
FIG. 14A-14B are block diagrams of exemplary API software stacks, according to embodiments.
Figure 14B:
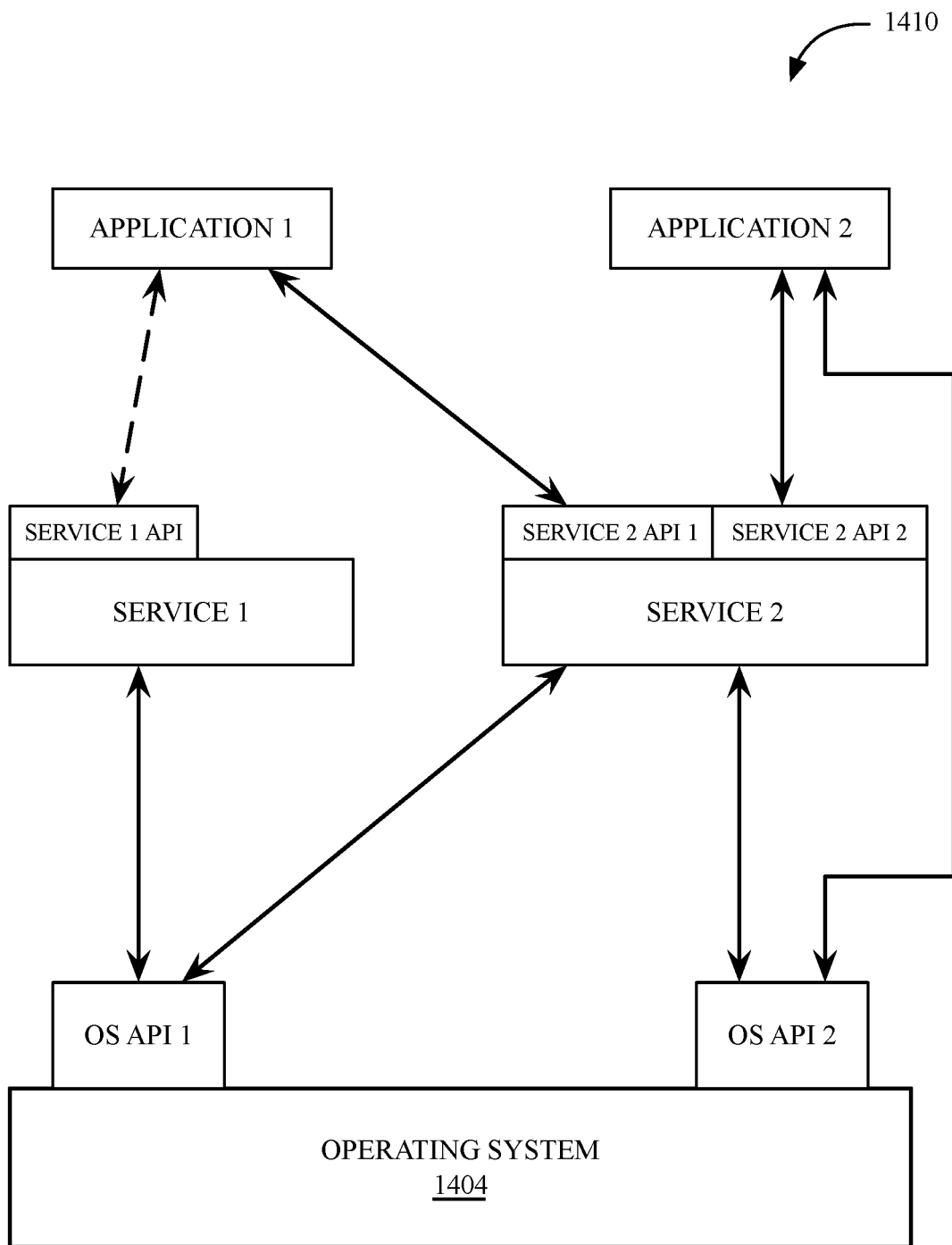

FIG. 14A-14B are block diagrams of exemplary API software stacks 1400, 1410, according to embodiments. FIG. 14A shows an exemplary API software stack 1400 in which applications 1402 can make calls to Service A or Service B using Service API and to Operating System 1404 using an OS API. Additionally, Service A and Service B can make calls to Operating System 1404 using several OS APIs.

FIG. 14B shows an exemplary software stack 1410 including Application 1, Application 2, Service 1, Service 2, and Operating System 1404. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 15:
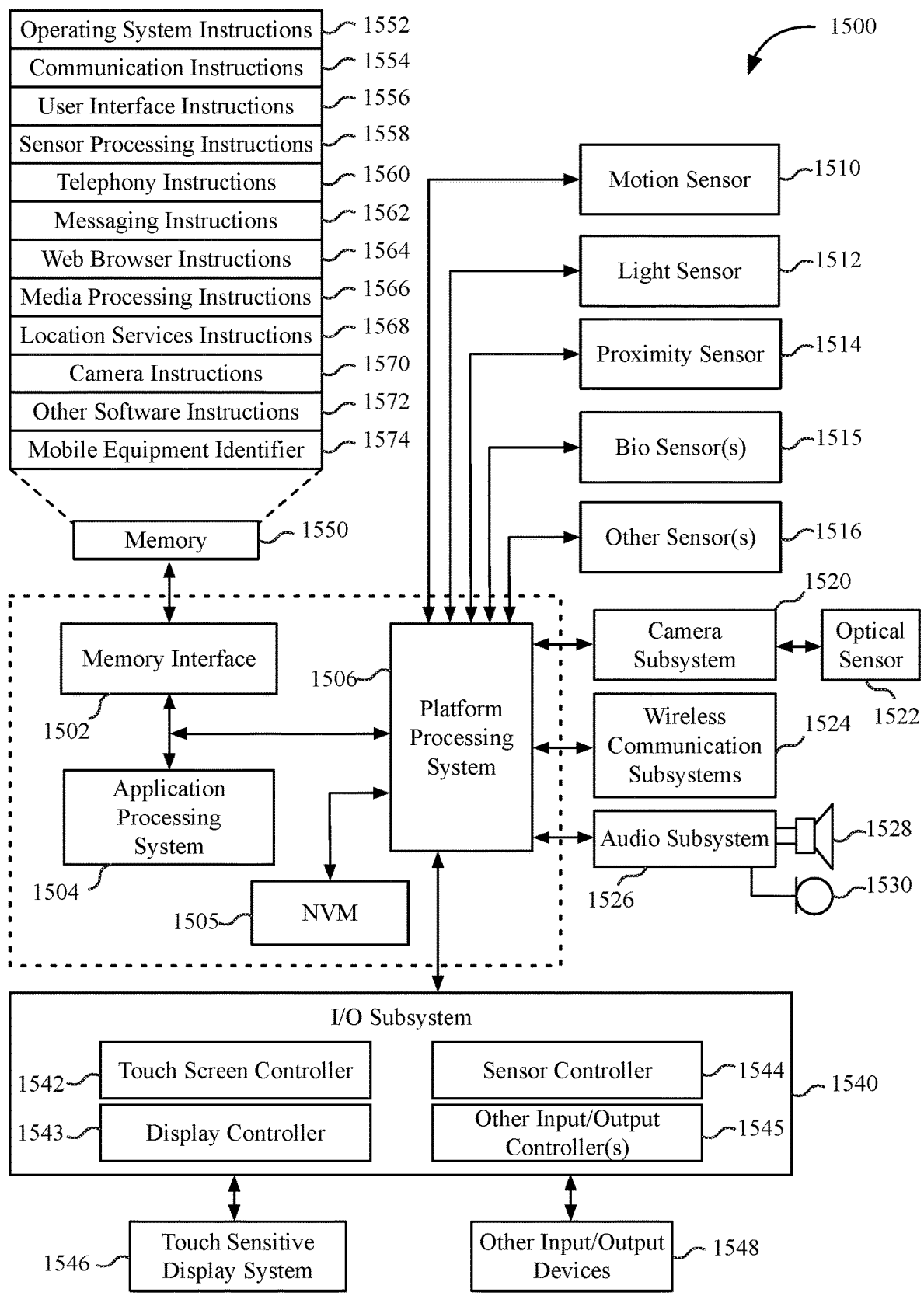
FIG. 15 is a block diagram of mobile device architecture, according to an embodiment.

FIG. 15 is a block diagram of a device architecture 1500 for a mobile or embedded device, according to an embodiment. The device architecture 1500 includes a memory interface 1502, a processing system 1504 including one or more data processors, image processors and/or graphics processing units, and a peripherals interface 1506. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The various components can be coupled by one or more communication buses or signal lines. The various components can be separate logical components or devices or can be integrated in one or more integrated circuits, such as in a system on a chip integrated circuit. The memory interface 1502 can be coupled to memory 1550, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1506 to facilitate multiple functionalities. For example, a motion sensor 1510, a light sensor 1512, and a proximity sensor 1514 can be coupled to the peripherals interface 1506 to facilitate the mobile device functionality. One or more biometric sensor(s) 1515 may also be present, such as a fingerprint scanner for fingerprint recognition or an image sensor for facial recognition. Other sensors 1516 can also be connected to the peripherals interface 1506, such as a positioning system (e.g., GPS receiver), a temperature sensor, or other sensing device, to facilitate related functionalities. A camera subsystem 1520 and an optical sensor 1522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1524, which can include radio frequency receivers and transmitters and/or optical (e.g., infrared) receivers and transmitters that can be configured receive or transmit data packets and/or data streams from a remote source. The specific design and implementation of the wireless communication subsystems 1524 can depend on the communication network(s) over which a mobile device is intended to operate. For example, a mobile device including the illustrated device architecture 1500 can include wireless communication subsystems 1524 designed to operate over a GSM network, a CDMA network, an LTE network, a Wi-Fi network, a Bluetooth network, or any other wireless network. In particular, the wireless communication subsystems 1524 can provide a communications mechanism over which a media playback application can retrieve resources from a remote media server or scheduled events from a remote calendar or event server.

An audio subsystem 1526 can be coupled to a speaker 1528 and a microphone 1530 to facilitate voice-enabled functions, such as voice recognition, voice replication, digital recording, and telephony functions. In smart media devices described herein, the audio subsystem 1526 can be a high-quality audio system including support for virtual surround sound.

The I/O subsystem 1540 can include a touch screen controller 1542 and/or other input controller(s) 1545. For computing devices including a display device, the touch screen controller 1542 can be coupled to a touch sensitive display system 1546 (e.g., touch-screen). The touch sensitive display system 1546 and touch screen controller 1542 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1546. Display output for the touch sensitive display system 1546 can be generated by a display controller 1543. In one embodiment, the display controller 1543 can provide frame data to the touch sensitive display system 1546 at a variable frame rate.

In one embodiment, a sensor controller 1544 is included to monitor, control, and/or processes data received from one or more of the motion sensor 1510, light sensor 1512, proximity sensor 1514, or other sensors 1516. The sensor controller 1544 can include logic to interpret sensor data to determine the occurrence of one of more motion events or activities by analysis of the sensor data from the sensors.

In one embodiment, the I/O subsystem 1540 includes other input controller(s) 1545 that can be coupled to other input/control devices 1548, such as one or more buttons, rocker switches, thumb-wheel, infrared port, USB port, and/or a pointer device such as a stylus, or control devices such as an up/down button for volume control of the speaker 1528 and/or the microphone 1530.

In one embodiment, the memory 1550 coupled to the memory interface 1502 can store instructions for an operating system 1552, including portable operating system interface (POSIX) compliant and non-compliant operating system or an embedded operating system. The operating system 1552 may include instructions for handling basic system services and for performing hardware dependent tasks. In some implementations, the operating system 1552 can be a kernel.

The memory 1550 can also store communication instructions 1554 to facilitate communicating with one or more additional devices, one or more computers and/or one or more servers, for example, to retrieve web resources from remote web servers. The memory 1550 can also include user interface instructions 1556, including graphical user interface instructions to facilitate graphic user interface processing.

Additionally, the memory 1550 can store sensor processing instructions 1558 to facilitate sensor-related processing and functions; telephony instructions 1560 to facilitate telephone-related processes and functions; messaging instructions 1562 to facilitate electronic-messaging related processes and functions; web browser instructions 1564 to facilitate web browsing-related processes and functions; media processing instructions 1566 to facilitate media processing-related processes and functions; location services instructions including GPS and/or navigation instructions 1568 and Wi-Fi based location instructions to facilitate location based functionality; camera instructions 1570 to facilitate camera-related processes and functions; and/or other software instructions 1572 to facilitate other processes and functions, e.g., security processes and functions, and processes and functions related to the systems. The memory 1550 may also store other software instructions such as web video instructions to facilitate web video-related processes and functions; and/or web shopping instructions to facilitate web shopping-related processes and functions. In some implementations, the media processing instructions 1566 are divided into audio processing instructions and video processing instructions to facilitate audio processing-related processes and functions and video processing-related processes and functions, respectively. A mobile equipment identifier, such as an International Mobile Equipment Identity (IMEI) 1574 or a similar hardware identifier can also be stored in memory 1550.

Each of the above identified instructions and applications can correspond to a set of instructions for performing one or more functions described above. These instructions need not be implemented as separate software programs, procedures, or modules. The memory 1550 can include additional instructions or fewer instructions. Furthermore, various functions may be implemented in hardware and/or in software, including in one or more signal processing and/or application specific integrated circuits.

Figure 16:
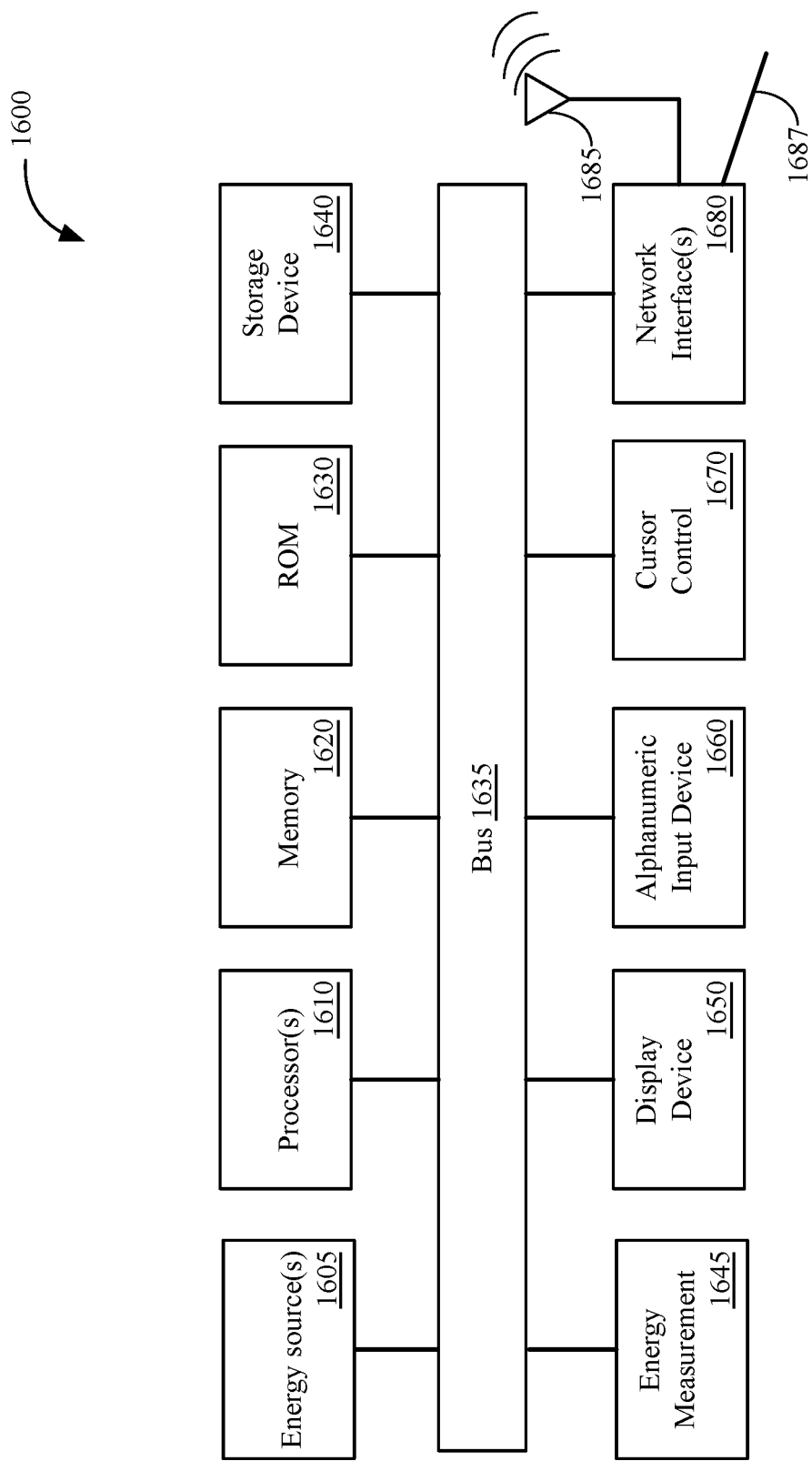
FIG. 16 is a block diagram illustrating an example computing system that can be used in conjunction with one or more of the embodiments of the disclosure.

FIG. 16 is a block diagram of a computing system 1600, according to an embodiment. The illustrated computing system 1600 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1600 can be used to provide the computing device and/or a server device to which the computing device may connect.

The computing system 1600 includes bus 1635 or other communication device to communicate information, and processor(s) 1610 coupled to bus 1635 that may process information. While the computing system 1600 is illustrated with a single processor, the computing system 1600 may include multiple processors and/or co-processors. The computing system 1600 further may include memory 1620, which can be random access memory (RAM) or other dynamic storage device coupled to the bus 1635. The memory 1620 may store information and instructions that may be executed by processor(s) 1610. The memory 1620 may also be used as main memory to store temporary variables or other intermediate information during execution of instructions by the processor(s) 1610.

The computing system 1600 may also include read only memory (ROM) 1630 and/or another data storage device 1640 coupled to the bus 1635 that may store information and instructions for the processor(s) 1610. The data storage device 1640 can be or include a variety of storage devices, such as a flash memory device, a magnetic disk, or an optical disc and may be coupled to computing system 1600 via the bus 1635 or via a remote peripheral interface.

The computing system 1600 may also be coupled, via the bus 1635, to a display device 1650 to display information to a user. The computing system 1600 can also include an alphanumeric input device 1660, including alphanumeric and other keys, which may be coupled to bus 1635 to communicate information and command selections to processor(s) 1610. Another type of user input device includes a cursor control 1670 device, such as a touchpad, a mouse, a trackball, or cursor direction keys to communicate direction information and command selections to processor(s) 1610 and to control cursor movement on the display device 1650. The computing system 1600 may also receive user input from a remote device that is communicatively coupled via one or more network interface(s) 1680.

The computing system 1600 further may include one or more network interface(s) 1680 to provide access to a network, such as a local area network. The network interface(s) 1680 may include, for example, a wireless network interface having antenna 1685, which may represent one or more antenna(e). The computing system 1600 can include multiple wireless network interfaces such as a combination of Wi-Fi, Bluetooth®, near field communication (NFC), and/or cellular telephony interfaces. The network interface(s) 1680 may also include, for example, a wired network interface to communicate with remote devices via network cable 1687, which may be, for example, an Ethernet cable, a coaxial cable, a fiber optic cable, a serial cable, or a parallel cable.

In one embodiment, the network interface(s) 1680 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1680 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1600 can further include one or more energy sources 1605 and one or more energy measurement systems 1645. Energy sources 1605 can include an AC/DC adapter coupled to an external power source, one or more batteries, one or more charge storage devices, a USB charger, or other energy source. Energy measurement systems include at least one voltage or amperage measuring device that can measure energy consumed by the computing system 1600 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein enable the interoperability between processes configured for pointer authentication and processes that are not configured for pointer authentication. Enabling the interoperability between such processes enables essential libraries, such as system libraries, to be compiled with pointer authentication, while enabling those libraries to still be used by processes that have not yet been compiled or configured to use pointer authentication. In one embodiment the interoperability is enabled by placing a copy of only the portions of system libraries that are used by processes without authentication in a separate region of virtual memory and mapping that separate region of virtual memory to those processes instead of the virtual memory that contains the authenticated version of the system libraries. Additionally, when a context switch occurs between processes with pointer authentication and processes without pointer authentication, the authentication features of the processor can be dynamically enabled or disabled.

Embodiments described herein also provide for an authentication key regime that enables the distinct authentication keys to be used when signing kernel mode and user mode pointers. A first set of keys are used to sign user mode pointers and different and/or additional keys can be used when signing addresses for kernel mode pointers. In such embodiments, a user mode pointer that is somehow caused to be signed by an attacker will not be valid for use in kernel mode. However, the kernel can sign pointers that can be validly used in user mode by temporarily disabling the use of the kernel key and/or enabling user mode keys when signing addresses for use by user mode.

Embodiments described herein also provide for thread state signing to ensure the thread state of a sleeping or waiting thread is not manipulated while the thread waits to resume execution. When a thread is in a sleeping or waiting state, or when an interrupt or exception occurs during execution of a thread, a thread state for the thread can be stored in memory. The thread state can include details such as the execution state (e.g., register values) of the tread and the program counter or instruction pointer associated with the thread. When a thread is sent to sleeping or waiting state, sensitive portions of the thread state can be signed by the processor before the thread state is stored to memory. When the thread is resumed, those pointers of the thread state can be authenticated to ensure that the thread state has not been manipulated while the thread was in the waiting or sleeping state. Once the thread state is authenticated, the thread state can be restored to the processor and thread execution can be resumed.

Embodiments described herein also provide for pointer application binary interface (ABI) versioning. An ABI versioning scheme enables the specific details of the signed or unsigned elements of system libraries to change between major or minor version revisions of an operating system. Program code used to sign pointers or data structures within system libraries can be annotated with a version number scheme that is associated with a specific set of signed or unsigned data structures and pointers. Third-party applications can be compiled for use against a specific pointer authentication ABI version, where during compilation the third-party applications are compiled with the knowledge of which system library pointers and data structures are expected to be signed. If a third-party application is executed on a system with a mis-matched pointer authentication ABI, address signing can be disabled for that application, allowing the application to execute without crashing, although the application may execute in a slightly less secure state. Execution of system binaries with a pointer authentication ABI mismatch can be disallowed, as the pointer authentication ABI version of system binaries and libraries should always match. A mismatch in pointer authentication ABI between a system binary and a system library may suggest that the system is has been compromised. In one embodiment, dynamic pointer authentication ABI versioning can be enabled for third party applications that are submitted in a bitcode format. Such applications can be dynamically compiled for the target OS and pointer version on which the application will be executed.

Additionally described herein is an embodiment that provides for a system comprising an integrated circuit including memory to store data and instructions and one or more processors coupled to the memory. Each of the one or more processors can be configured as an execution agent of the integrated circuit. The one or more processors can derive one or more agent master keys for use by one or more execution agents, the one or more agent master keys derived from a master key of the integrated circuit, derive a set of signature and authentication keys for use by the one or more execution agents, sign, by an execution agent, a memory address of a pointer with one or more of the signature and authentication keys associated with the execution agent, store the pointer to the memory, and authenticate the pointer before execution of an instruction associated with the pointer.

A further embodiment provides for a non-transitory machine readable medium storing instructions to cause at least one of multiple processors of a system on a chip integrated circuit (SOC) to perform operations comprising deriving one or more agent master keys for use by one or more of the multiple processors of the SOC, where the one or more agent master keys are derived from a master key of the SOC. The operations additionally include deriving a set of signature and authentication keys for use by one or more of the multiple processors, signing an address of a pointer using one or more of the signature and authentication keys, storing the pointer to a memory, and authenticating the pointer before executing an instruction associated with the pointer.

An additional embodiment provides for a method comprising, on a processor of an electronic device: generating a pointer, selecting a hardware-based key for use to generate a signature for the pointer, diversifying the hardware-based key with selected key diversification data to generate a diversified key, signing a value of an address within the pointer with the diversified key to generate a pointer signature, and verifying the pointer signature before referencing the address within the pointer with the processor.

In one embodiment, a system comprises a memory to store data and instructions and a processor coupled to the memory. The processor includes an execution core that is switchable between a first mode and a second mode. In the first mode the execution core is to authenticate a memory address, via a signature associated with the memory address, before execution of an instruction associated with the memory address. In the second mode the execution core is to bypass authentication of the memory address, and the processor is to switch between the first mode and the second mode in response to execution of an instruction fetched from the memory.

One embodiment provides for a non-transitory machine readable medium storing instructions to cause a processor on a system on a chip integrated circuit (SOC) to perform operations comprising, before executing an instruction associated with a memory address, authenticating the memory address at the processor of the system via a signature associated with the memory address, the authenticating performed while the processor is in a first operational mode. The operations additionally comprise bypassing authentication of the memory address before executing the instruction associated with the memory address while the processor is in a second operational mode and switching the processor between the first mode and the second mode in response to execution of an instruction fetched from the memory.

One embodiment provides for a non-transitory machine readable medium storing instructions to cause one or more processors of a computing device to perform operations comprising loading a first process into memory of the computing device. The first process is linked against a shared library stored on the computing device. The operations additionally comprise loading a second process into memory of the computing device, where the second process linked against the shared library stored on the computing device and the second process includes program code to authenticate a signature of an address of a pointer used by the program code of the second process. The program code is used to authenticate the signature using an instruction provided by an instruction set architecture of the one or more processors. The operations additionally comprise mapping a first portion of a shared library stored on the computing device to a first virtual memory address in an address space of the first process, mapping a second portion of the shared library to a second virtual memory address in the address space of the second process, wherein the second portion of the shared library is configured to use the instruction provided by the instruction set architecture of the one or more processors to authenticate a signature of an address of a pointer used by the program code of the shared library, configuring the one or more processors to enable signature authentication during a context switch to the second process, and configuring the one or more processors to disable signature authentication during a context switch to the first process.

One embodiment provides for a method comprising, on a processor of an electronic device, generating a pointer; selecting a hardware-based key to generate a signature for the pointer; diversifying the hardware-based key with selected key diversification data to generate a diversified key; signing a value of an address within the pointer with the diversified key to generate a pointer signature; and verifying the pointer signature before referencing the address within the pointer with the processor.

One embodiment provides for a data processing system comprising a memory to store data and instructions and a processor coupled to the memory. The processor is configured to execute the instructions stored in the memory. The instructions cause the processor to derive a processor master key from a master key of an integrated circuit that includes the processor; derive a signature and authentication key based on the processor master key; write a stack cookie into a stack stored in the memory along a stack overflow path to a secured pointer; sign the stack cookie using the signature and authentication key to generate a signed stack cookie; and authenticate the signed stack cookie via the signature and authentication key before accessing an address of the secured pointer.

One embodiment provides for a non-transitory machine readable medium storing instructions to cause a processor on a system on a chip integrated circuit (SOC) to perform operations comprising selecting a hardware-based key to generate a signature for one or more pointers; diversifying the hardware-based key with selected key diversification data to generate a diversified key; signing a value of an address within the one or more pointers with the diversified key to generate one or more pointer signatures, wherein the one or more pointers include one or more a boundary pointers at a beginning or end of a memory allocation associated with a data structure; and verifying the one or more pointer signatures before accessing data within the data structure to detect memory corruption associated with the data structure.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method performed by an execution core of a processor coupled to a memory, the method comprising:
   determining that a first mode of the execution core is enabled for a first process, wherein the first process supports pointer authentication;
   authenticating, while in the first mode, a first memory address via a signature associated with the first memory address, the authenticating occurring before execution of an instruction associated with the first memory address;
   switching from the first mode to a second mode in response to execution of an instruction of a second process fetched from the memory, wherein the second process does not support pointer authentication; and
   bypassing, while in the second mode, authentication of a second memory address for the second process.

2. The method according to claim 1, further comprising:
   determining that the first mode of the execution core is enabled for a third process; and
   after determining that the first mode is enabled for the third process, enabling a key for generating a signature for the third process that is different from a key for generating a signature for the first process.

3. The method according to claim 1, further comprising, prior to switching between the first mode to the second mode, toggling a key enable setting.

4. The method according to claim 3, wherein toggling the key enable setting enables memory address signing or disables memory address signing.

5. The method according to claim 1, further comprising:
   in response to determining that the first mode is enabled for the first process, generating the signature associated with the first memory address.

6. The method according to claim 5, further comprising, after generating the signature, enabling a key to authenticate the signature associated with the first memory address.

7. The method according to claim 1, wherein the second mode is for a process that does not support memory address signing.

8. The method according to claim 1, further comprising:
in response to determining that the second mode is enabled for the second process, disabling a key to authenticate the signature associated with the second memory address.

9. The method according to claim 1, wherein the execution core is configured to switch between the first mode and the second mode at a boundary between execution of the first process and execution of the second process.

10. The method according to claim 1, wherein the first mode enables use of a system library compiled with pointer authentication, and wherein the second mode enables use of a system library that is not compiled with pointer authentication.

11. The method according to claim 1, wherein the execution core is an operating system kernel of the processor.

12. A system comprising:
a memory to store data and instructions; and
a processor coupled to the memory, the processor including an execution core, wherein the execution core is switchable between a first mode and a second mode,
wherein, in the first mode that is enabled for a first process, the execution core is configured to authenticate a first memory address via a signature associated with the first memory address, before execution of an instruction associated with the first memory address, and
wherein, in the second mode, the execution core is configured to bypass authentication of a second memory address for a second process without support for pointer authentication, and wherein the processor is configured to switch between the first mode and the second mode in response to execution of an instruction fetched from the memory.

13. The system according to claim 12, wherein the processor is further configured to:
determine that the first mode of the execution core is enabled for a third process; and
after determining that the first mode is enabled for the third process, enable a key for generating a signature for the third process that is different from a key for generating a signature for the first process.

14. The system according to claim 12, wherein the processor is further configured to, prior to switching between the first mode to the second mode, toggle a key enable setting.

15. The system according to claim 14, wherein toggling the key enable setting enables memory address signing or disables memory address signing.

16. The system according to claim 12, wherein the processor is further configured to:
in response to determining that the first mode is enabled for the first process, generate the signature associated with the first memory address.

17. The system according to claim 16, wherein the processor is further configured to, after generating the signature, enable a key to authenticate the signature associated with the first memory address.

18. The system according to claim 12, wherein the processor is further configured to:
in response to determining that the second mode is enabled for the second process, disable a key to authenticate the signature associated with the second memory address.

19. The system according to claim 12, wherein the execution core is configured to switch between the first mode and the second mode at a boundary between execution of the first process and execution of the second process.

20. The system according to claim 12, wherein the first mode enables use of a system library compiled with pointer authentication, and wherein the second mode enables use of a system library that is not compiled with pointer authentication.

21. A non-transitory machine readable medium storing instructions which, when executed, cause one or more processors to perform operations comprising:
determining that a first mode of an execution core is enabled for a first process, wherein the first process supports pointer authentication;
authenticating, while in the first mode, a first memory address via a signature associated with the first memory address, the authenticating occurring before execution of an instruction associated with the first memory address;
switching from the first mode to a second mode in response to execution of an instruction of a second process fetched from a memory, wherein the second process does not support pointer authentication; and
bypassing, while in the second mode, authentication of a second memory address for the second process.

\* \* \* \* \*